United States Patent
Taylor et al.

(10) Patent No.: US 6,478,849 B1
(45) Date of Patent: Nov. 12, 2002

(54) VAPOR RECOVERY SYSTEM FOR FUEL STORAGE TANK

(75) Inventors: Ken W. Taylor, Oak Ridge, NC (US); Robert G. McKinney, Houston; Herbert E. Reinhold, The Woodlands, both of TX (US)

(73) Assignees: Dresser, Inc., Addison, TX (US); Nitrotec Energy Corporation, New York, NY (US)

( * ) Notice: Subject to any disclaimer, the term of this patent is extended or adjusted under 35 U.S.C. 154(b) by 0 days.

(21) Appl. No.: 09/637,416

(22) Filed: Aug. 11, 2000

(51) Int. Cl.$^7$ .............................................. B01D 53/04
(52) U.S. Cl. ...................... 95/11; 95/21; 95/99; 95/106; 95/146; 96/111; 96/113; 96/117; 96/122; 96/128; 96/130; 96/419
(58) Field of Search .......................... 95/1, 11, 21, 95, 95/99, 106, 146; 96/109, 111–113, 117, 121, 122, 126–128, 130, 143, 144, 146, 419

(56) References Cited

U.S. PATENT DOCUMENTS

| | | | | |
|---|---|---|---|---|
| 2,211,162 A | * | 8/1940 | Ray et al. ....................... | 95/11 |
| 2,278,854 A | * | 4/1942 | Hunsicker ..................... | 96/109 |
| 2,297,763 A | * | 10/1942 | Higley et al. .................. | 96/109 |
| 2,328,521 A | * | 8/1943 | Wittmann ...................... | 96/111 |
| 2,506,578 A | * | 5/1950 | Case ........................... | 96/109 X |
| 3,581,782 A | * | 6/1971 | Onufer ......................... | 96/146 X |
| 3,867,111 A | * | 2/1975 | Knowles ...................... | 96/113 X |
| 3,881,894 A | * | 5/1975 | Onufer ......................... | 96/127 X |
| 3,918,932 A | * | 11/1975 | Lee et al. .................... | 96/112 X |
| 3,926,230 A | * | 12/1975 | Stary et al. ................... | 96/130 X |
| 4,025,324 A | * | 5/1977 | Stackhouse, Jr. et al. ..... | 96/111 |
| 4,047,904 A | * | 9/1977 | Worrall ........................ | 96/111 X |
| 4,392,870 A | * | 7/1983 | Chieffo et al. .............. | 96/130 X |
| 4,995,890 A | * | 2/1991 | Croudace ..................... | 96/111 |
| 5,038,838 A | | 8/1991 | Bergamini et al. ............ | 141/59 |
| 5,194,075 A | * | 3/1993 | Matsuoka ..................... | 96/144 |
| 5,294,246 A | * | 3/1994 | Gardner, Sr. ................ | 95/21 X |
| 5,294,407 A | * | 3/1994 | Succi et al. ................. | 96/419 X |
| 5,389,125 A | * | 2/1995 | Thayer et al. ................ | 95/11 |
| 5,464,466 A | | 11/1995 | Nanaji et al. ................. | 95/45 |
| 5,591,254 A | * | 1/1997 | Gibson ........................ | 96/113 |
| 5,755,854 A | | 5/1998 | Nanaji ........................ | 95/11 |
| 6,059,856 A | * | 5/2000 | Ohlrogge et al. ............. | 95/1 |
| 6,174,351 B1 | * | 1/2001 | McDowell et al. ........ | 96/111 X |

FOREIGN PATENT DOCUMENTS

DE          2136647        *  2/1973  .................. 96/109

* cited by examiner

Primary Examiner—Robert H. Spitzer
(74) Attorney, Agent, or Firm—Jenkens & Gilchrist, P.C.

(57) ABSTRACT

A vapor recovery system for a fuel storage tank. The system includes a pair of VOC adsorbent canisters that alternately recover VOC vapors from the fuel tank ullage or are regenerated. Regeneration of the VOC adsorbent canisters is provided by exhausting the VOC vapors from the VOC canisters using a vacuum pump and back into the fuel tank ullage. When the operating pressure of the fuel tank ullage is elevated, an auxiliary VOC adsorbent canister is operated in parallel with the pair of canisters in order to recover the increased amount of VOC vapors in the tank ullage.

109 Claims, 12 Drawing Sheets

VAPOR RECOVERY SYSTEM FOR FUEL STORAGE TANK

BACKGROUND

This invention relates generally to systems for reducing the discharge of pollutants from fuel storage tanks, and in particular to vapor recovery systems for fuel storage tanks.

When fuel is added to a fuel reservoir, such as the gasoline tank of an automobile, from a conventional gas dispenser, such as the dispensing nozzle of a gasoline dispenser, gasoline vapor is displaced from the gasoline tank. If the vapor is not collected in some manner, it will be released into the atmosphere. Due to the large number of automobile refuelings, such releases of fuel vapor constitute a significant hazard to the environment, particularly in heavily populated areas. Releases of these vapors, which are composed of volatile organic compounds (VOCs) such as hydrocarbons, are presently the subject of significant and increasing federal and state regulation.

In order to guard against the release of VOCs to the environment, several vapor collection systems have been designed and implemented to collect the vapors displaced from automobile gasoline tanks during refueling. All of these systems collect the vapors during refueling and discharge them into the underground fuel storage tank. These systems have proven to be very capable of transporting the vast majority of the vapor from the filler pipe of the automobile to the underground fuel storage tank. However, in some cases, the act of pumping the vapor can lead to pressurization of the underground fuel storage tank and the associated piping. In addition, other factors, such as temperature changes, can lead to pressurization.

Another manner in which fuel storage tanks can become pressurized is during the filling of the fuel storage tank by a fuel tanker truck. In particular, conventional fuel tanker trucks include vapor recovery systems for collecting fuel vapors displaced from the fuel storage tank during the filling process. However, the vapor recovery systems of conventional fuel tanker trucks are typically not capable of collecting all of the displaced vapor, or the vapor recovery systems may not be operated properly by the operator. As a result, the fuel storage tank can become pressurized by the displaced vapors created during the filling process.

The underground fuel storage tanks and piping include an area above the liquid known as the ullage, in which air and fuel vapors reside. The pressurized air and fuel vapors within the ullage will have a tendency to leak out of any hole in the tank or piping of the system, or they can be released from the ullage through a pressure relief valve, thus allowing the release of the polluting VOC vapor to the atmosphere. Thus, controlling the pressure of the ullage is an important component of minimizing the fugitive release of VOC vapors.

Conventional systems for controlling the pressure of the ullage have relied upon vapor recovery systems that pump vapors from the ullage, adsorb the VOC vapors, and vent the non-polluting VOC-free air into the atmosphere. The VOCs are typically adsorbed using a plurality of VOC adsorbent canisters. During the vapor recovery process, a first canister adsorbs VOCs. When the first VOC adsorbent canister becomes saturated, a second VOC adsorbent canister is used to adsorb VOCs, and the first VOC adsorbent canister is regenerated by sweeping VOC-free air through the first VOC adsorbent canister. This cycle of adsorption and regeneration alternates between the canisters until the tank ullage pressure is reduced to a threshold level. Such conventional vapor recovery systems for fuel storage tanks are complex and expensive to build and maintain due to the required valving and controls for switching the canisters during the adsorption and regeneration cycles. Furthermore, the regeneration of the VOC adsorbent canisters by sweeping VOC-free air through the saturated canisters introduces a large volume of air into the ullage thereby further pressurizing the ullage. Finally, the conventional vapor recovery systems do not eliminate fugitive emissions of VOCs from fuel storage tanks during dispensing of the fuel, periods of non-use, and intervals of time when fuel is being delivered to the fuel storage tank.

The present invention is directed to overcoming one or more of the limitations of existing approaches to recovering vapors in fuel storage tanks.

SUMMARY

According to an embodiment of the present invention, a vapor recovery system for a fuel storage tank having an ullage including VOC vapors and non-VOC vapors is provided that includes an ullage pressure sensor coupled to the ullage for sensing the operating pressure of the ullage, a vapor pump coupled to the ullage for pumping vapors from the ullage, a vacuum pump coupled to the ullage for exhausting vapors into the ullage, a first canister containing a VOC adsorbent material for adsorbing VOC-vapors, a second canister containing a VOC adsorbent material for adsorbing VOC-vapors, an atmospheric vent coupled to the first and second canisters for conveying vapors exhausted by the canisters to the atmosphere, a first recovery valve coupled between the vapor pump and the first canister for controlling the flow of vapors from the vapor pump to the first canister, a second recovery valve coupled between the vapor pump and the second canister for controlling the flow of vapors from the vapor pump to the second canister, a first regeneration valve coupled between the vacuum pump and the first canister for controlling the exhaustion of vapors from the first canister by the vacuum pump, a second regeneration valve coupled between the vacuum pump and the second canister for controlling the exhaustion of vapors from the second canister by the vacuum pump, and a controller coupled to the pressure sensor, the vapor pump, the vacuum pump, the recovery valves, and the regeneration valves. If the sensed operating pressure of the ullage exceeds a first set point, the controller is adapted to operate the vapor pump to pump vapors out of the ullage, and operate the first recovery valve to permit vapors pumped by the vapor pump to flow through the first canister. The VOC-vapors are adsorbed within the first canister and substantially all of the non-VOC vapors are exhausted from the first canister to the atmosphere through the atmospheric vent.

According to another embodiment of the invention, a VOC adsorbent canister for use in a vapor recovery system for a fuel storage tank having an ullage including VOC-vapors and non-VOC vapors is provided that includes a housing containing VOC adsorbent materials and a strain gauge coupled to the exterior surface of the housing for measuring the weight of the housing.

The present embodiments of the invention provide a number of advantages. For example, the use of a pair of VOC adsorbent canisters that are alternately used to adsorb VOC vapors and regenerated provides substantially constant adsorption of VOC vapors from the ullage. Moreover, the use of a vacuum pump to exhaust VOC vapors from the saturated VOC adsorbent canisters and thereby regenerate the canisters minimizes the amount of non-VOC vapor that is reintroduced into the ullage during the regeneration process. In this manner, the operating pressure of the ullage is minimally increased during the regeneration process. Furthermore, the use of a pair of VOC adsorbent canisters to recover VOC vapors during normal operating conditions by alternating between vapor recovery and regeneration provides an efficient and cost effective system for VOC vapor recovery. In addition, the additional parallel use of a third VOC adsorbent canister having increased VOC adsorbing capacity permits the system to effectively and efficiently handle increased operating pressures within the ullage. Also, the additional use of heaters for regenerating the VOC adsorbent materials within the VOC adsorbent canisters increases the rate at which the canisters may be regenerated. Finally, sensing the level of saturation of the VOC adsorbent canisters by weighing the canisters and/or monitoring the pressure of the VOC vapors provides a reliable method of monitoring the saturation level of the VOC adsorbent canisters.

DESCRIPTION OF THE PREFERRED EMBODIMENTS

Figure 1:
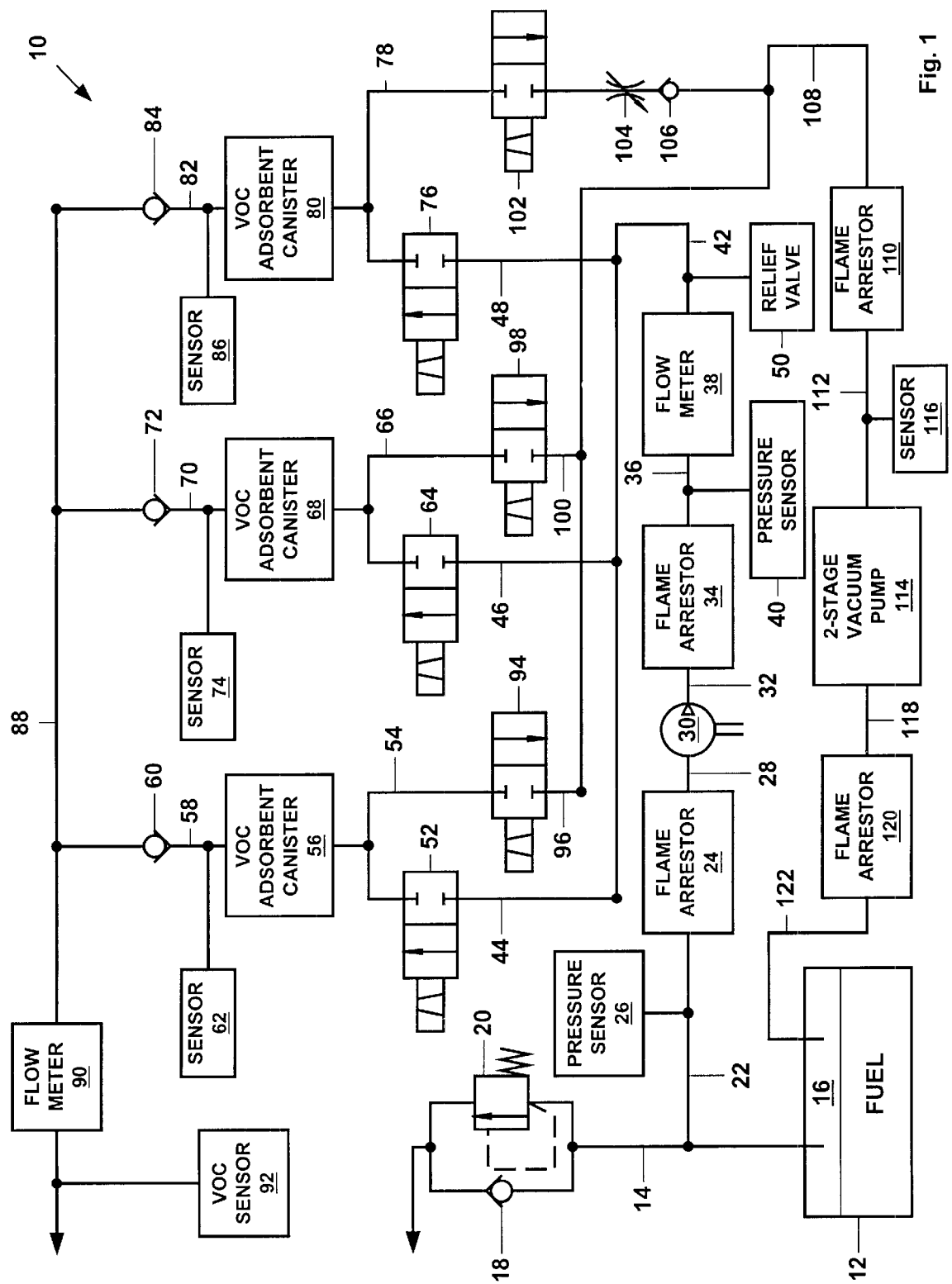
FIG. 1 is an schematic illustration of an embodiment of a vapor recovery system for a fuel storage tank.
Figure 2:
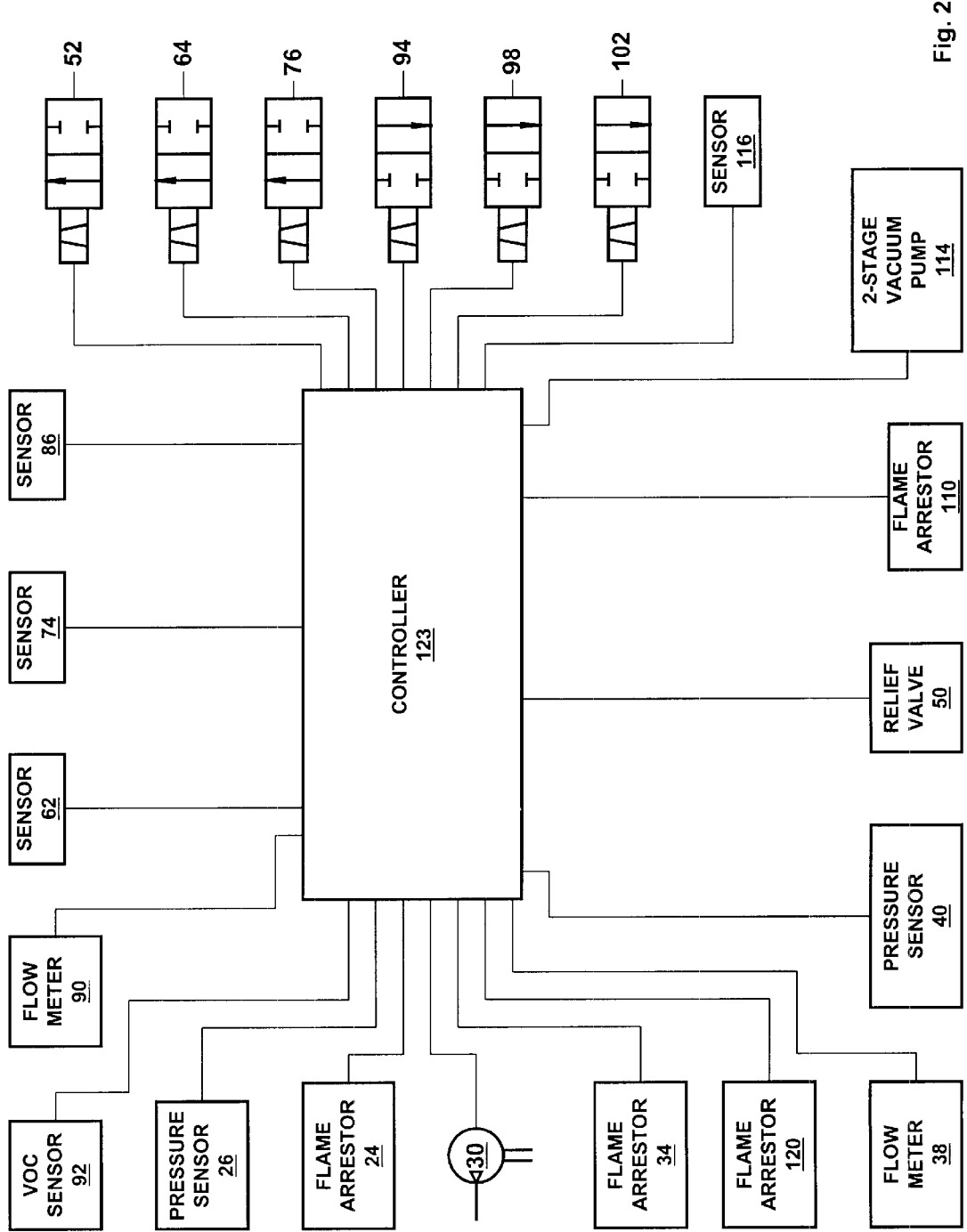
FIG. 2 is a schematic illustration of the control and monitoring of the elements of the system of FIG. 1.

Referring to FIGS. 1 and 2, the reference numeral 10 refers, in general, to a vapor recovery system for a fuel storage tank 12 according to an embodiment of the invention that includes a conduit 14 in communication with ullage 16 within the fuel storage tank 12. A check valve 18 is connected to an end of the conduit 14 for permitting outside air to enter the conduit 14 when the pressure within the ullage 16 is less than atmospheric in order to prevent a dangerous underpressurization of the ullage 16 and a pressure relief valve 20 is connected to the end of the conduit 14 for permitting vapors within the ullage 16 to be exhausted when the operating pressure within the ullage 16 is greater than a predetermined threshold level in order to prevent a dangerous over pressurization of the ullage 16.

An end of a conduit 22 is connected to the conduit 14 for conveying vapors from the conduit to the inlet of a conventional flame arrestor 24. A pressure sensor 26 is connected to the conduit 22 for monitoring the operating pressure within the ullage 16 for reasons to be described. An end of a conduit 28 is connected to the outlet of the flame arrestor 24 for conveying vapors from the flame arrestor 24 to the inlet of a variable speed vapor pump 30 for pumping vapors from the conduit 28. An end of a conduit 32 is connected to the outlet of the vapor pump 30 for conveying vapors from the vapor pump to the inlet of a conventional flame arrestor 34. An end of a conduit 36 is connected to the outlet of the flame arrestor 34 for conveying vapors from the flame arrestor to the inlet of a flow meter 38 for monitoring the flow rate of the exhaust of the vapor pump 30. A pressure sensor 40 is also connected to the conduit 36 for monitoring the exhaust pressure of the vapor pump 30. An end of a conduit 42 is connected to the outlet of the flow meter 38 for conveying vapors from the flow meter to ends of conduits 44, 46, and 48. A pressure relief valve 50 is also connected to the conduit 42 for permitting vapors within the conduit 42 to be exhausted when the operating pressure within the conduit 42 is greater than a predetermined threshold level in order to prevent a dangerous over pressurization of the conduit 42.

Another end of the conduit 44 is connected to the inlet of a two-port/two-position solenoid valve 52 for controlling the flow of vapors from the conduit to an end of a conduit 54. A first VOC adsorbent canister 56 is connected to another end of the conduit 54 for adsorbing VOC vapors conveyed from the conduit into the interior of the canister 56. An end of a conduit 58 is connected to the outlet of the canister 56 for conveying non-VOC vapors from the canister to the inlet of a check valve 60 for permitting the exhaust of non-VOC vapors from the conduit 58. A sensor 62 is also connected to the conduit 58 for monitoring the outlet pressure of the canister 56 and the VOC concentration of the exhaust from the canister 56.

Another end of the conduit 46 is connected to the inlet of a two-port/two-position solenoid valve 64 for controlling the flow of vapors from the conduit to an end of a conduit 66. A second VOC adsorbent canister 68 is connected to another end of the conduit 66 for adsorbing VOCs conveyed from the conduit into the interior of the canister 68. An end of a conduit 70 is connected to the outlet of the canister 68 for conveying non-VOC vapors from the canister to an inlet of a check valve 72 for permitting the exhaust of non-VOC vapors from the conduit 70. A sensor 74 is also connected to the conduit 70 for monitoring the outlet pressure of the canister 68 and the VOC concentration of the exhaust from the canister 68.

Another end of the conduit 48 is connected to the inlet of a two-position solenoid valve 76 for controlling the flow of vapors from the conduit to an end of a conduit 78. A third VOC adsorbent canister 80 is connected to another end of the conduit 78 for adsorbing VOCs conveyed from the conduit into the interior of the canister 80. An end of a conduit 82 is connected to the outlet of the canister 80 for conveying non-VOC vapors from the outlet of the canister to an inlet of a check valve 84 for permitting the exhaust of non-VOC vapors from the conduit 82. A sensor 86 is also connected to the conduit 82 for monitoring the outlet pressure of the canister 80 and the VOC concentration of the exhaust from the canister 80.

In an exemplary embodiment, the VOC adsorbent canisters 56, 68, and 80 contain VOC adsorbent materials suitable for adsorbing gasoline vapors such as, for example, processed carbon, activated charcoal and/or synthetic zeolite with a molecular pattern designed to adsorb molecules of a specific type and pass all other molecules. Furthermore, in an exemplary embodiment, the VOC adsorption capacity of the third VOC adsorbent canister 80 is greater than the VOC adsorption capacity of the first and second VOC adsorbent canisters, 56 and 68.

A conduit 88 is connected to the outlets of the check valves 60, 72, and 84 for conveying vapors from the check valves to the atmosphere. A flow meter 90 is connected to the conduit 88 for monitoring the flow rate of the vapors exhausted from the system 10 and a VOC sensor 92 is connected to the conduit 88 for monitoring the concentration of VOC vapors in the vapors exhausted from the system 10.

A two-port/two position solenoid valve 94 is connected to another end of the conduit 54 for controlling the flow of vapors from the conduit to an end of a conduit 96. A two-port/two position solenoid valve 98 is connected to another end of the conduit 66 for controlling the flow of vapors from the conduit to an end of a conduit 100. A two-port/two-position solenoid valve 102 is connected to another end of the conduit 78 for controlling the flow of vapors from the conduit to the inlet of a variable orifice 104 for limiting the flow rate of vapors out of the valve 102. The outlet of the variable orifice 104 is connected to the inlet of a check valve 106 for reasons to be described. The other ends of the conduits 96 and 100, and the outlet of the check valve 106 are connected to a conduit 108.

An end of the conduit 108 is connected to the inlet of a conventional flame arrestor 110. An end of a conduit 112 is connected to the outlet of the flame arrestor 110 for conveying vapors from the flame arrestor to the inlet of a 2-stage vacuum pump 114 for exhausting vapors from the VOC adsorbent canisters 56, 68, and 80. A sensor 116 is also connected to the conduit 112 for monitoring the inlet pressure of the vacuum pump 114 and the VOC concentration of the vapors within the conduit 112. An end of a conduit 118 is connected to the outlet of the vacuum pump 114 for conveying vapors from the vacuum pump to the inlet of a conventional flame arrestor 120. An end of a conduit 122 is connected to the outlet of the flame arrestor 120 for conveying vapors into the ullage 16.

A controller 123 monitors and/or controls the operation of the pressure sensor 26, the vapor pump 30, the flow meter 38, the pressure sensor 40, the solenoid valves 52, 64, 76, 94, 98, and 102, the sensors 62, 74, and 86, the flow meter 90 and the VOC sensor 92 as described below.

During operation of the system 10, as illustrated in FIG. 1, the pressure sensor 26 continuously monitors the operating pressure of the ullage 16. If the operating pressure of the ullage 16 is less than or equal to a first set point pressure $P_1$, then the solenoid valves 52, 64, 76, 94, 98, and 102 are closed, and the vapor pump 30 and vacuum pump 114 do not operate.

Figure 3A:
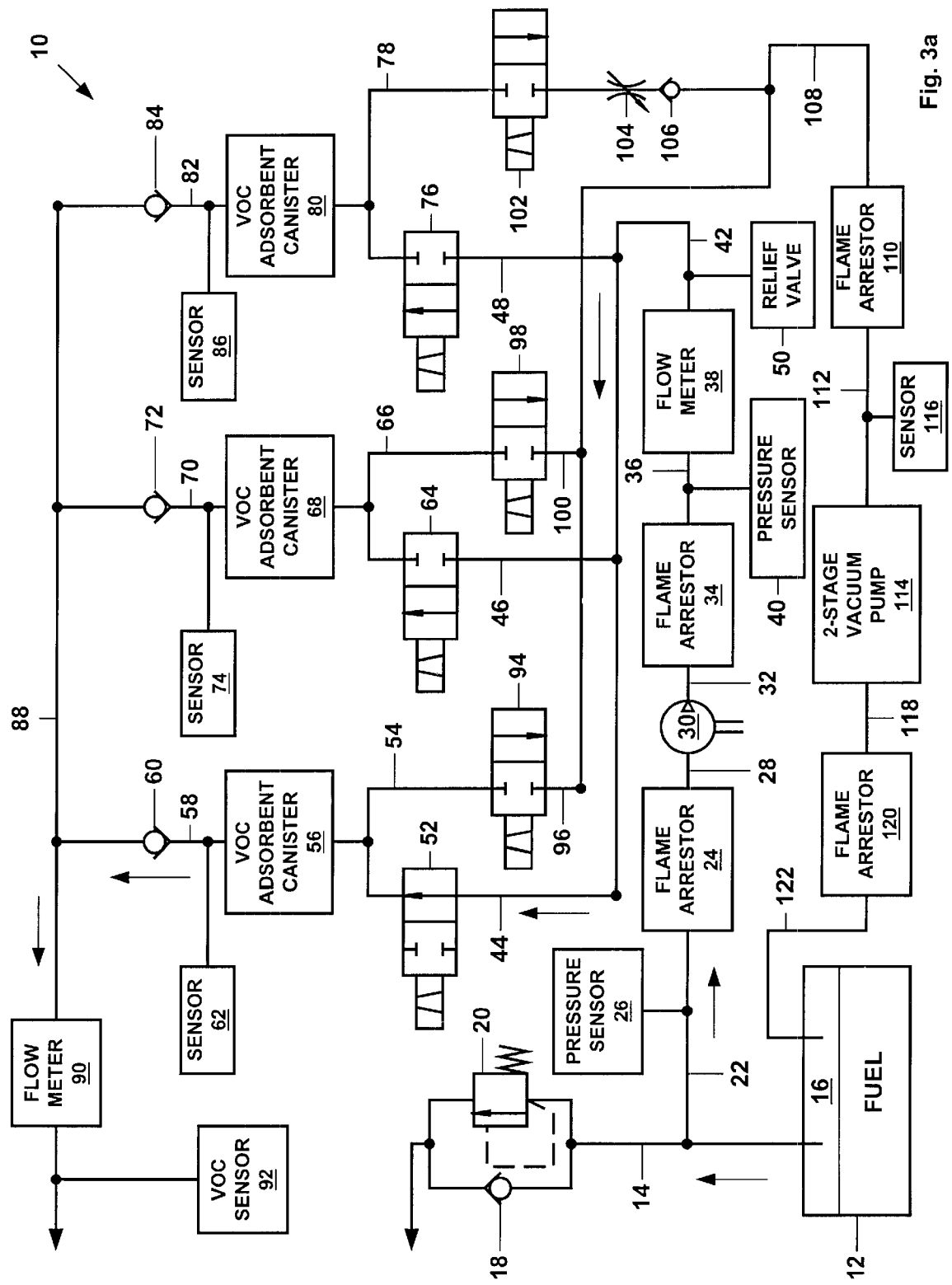
FIG. 3a is a schematic illustration of the system of FIG. 1 during operation in which the first VOC adsorbent canister recovers VOC vapors.

As illustrated in FIG. 3a, if the operating pressure of the ullage 16 is greater than a first set point pressure $P_1$ then the vapor pump 30 operates at a first speed in order to pump vapors from the ullage 16 at a first volumetric flow rate. The vapors are conveyed from the ullage 16 through the conduits 14, 22 and 28 to the inlet of the vapor pump 30. The vapors are pumped from the outlet of the vapor pump 30 through the conduits 32 and 36 to the conduit 42. The outlet flow rate and operating pressure of the vapor pump 30 are monitored by the flow meter 38 and the pressure sensor 40, respectively. If the operating pressure and/or the flow rate of the outlet of the vapor pump 30 exceed predetermined alarm set points, then the system 10 shuts down the vapor pump 30, closes the solenoid valve 52, and generates an alarm in order to prevent a potentially dangerous operating condition.

The vapors are then conveyed into the first VOC adsorbent canister 56 through the open solenoid valve 52 and the conduit 54. Within the canister 56, the VOC vapors are adsorbed by the VOC adsorbent material within the canister. The non-VOC vapors are then conveyed out of the canister 56 through the check valve 60 and exhausted to the atmosphere. The flow rate and VOC concentration of the exhausted vapors are monitored by the flow meter 90 and the VOC sensor 92, respectively. In this manner, polluting VOC vapors are adsorbed and maintained within the VOC adsorbent canister 56 while non-polluting non-VOC vapors are exhausted to the atmosphere. In the event of an excessive concentration of VOC vapors within the exhausted vapors, the system 10 shuts down the vapor pump 30, closes the solenoid valve 52, and generates an alarm thereby preventing the exhaust of VOC vapors from the system 10.

Figure 3B:
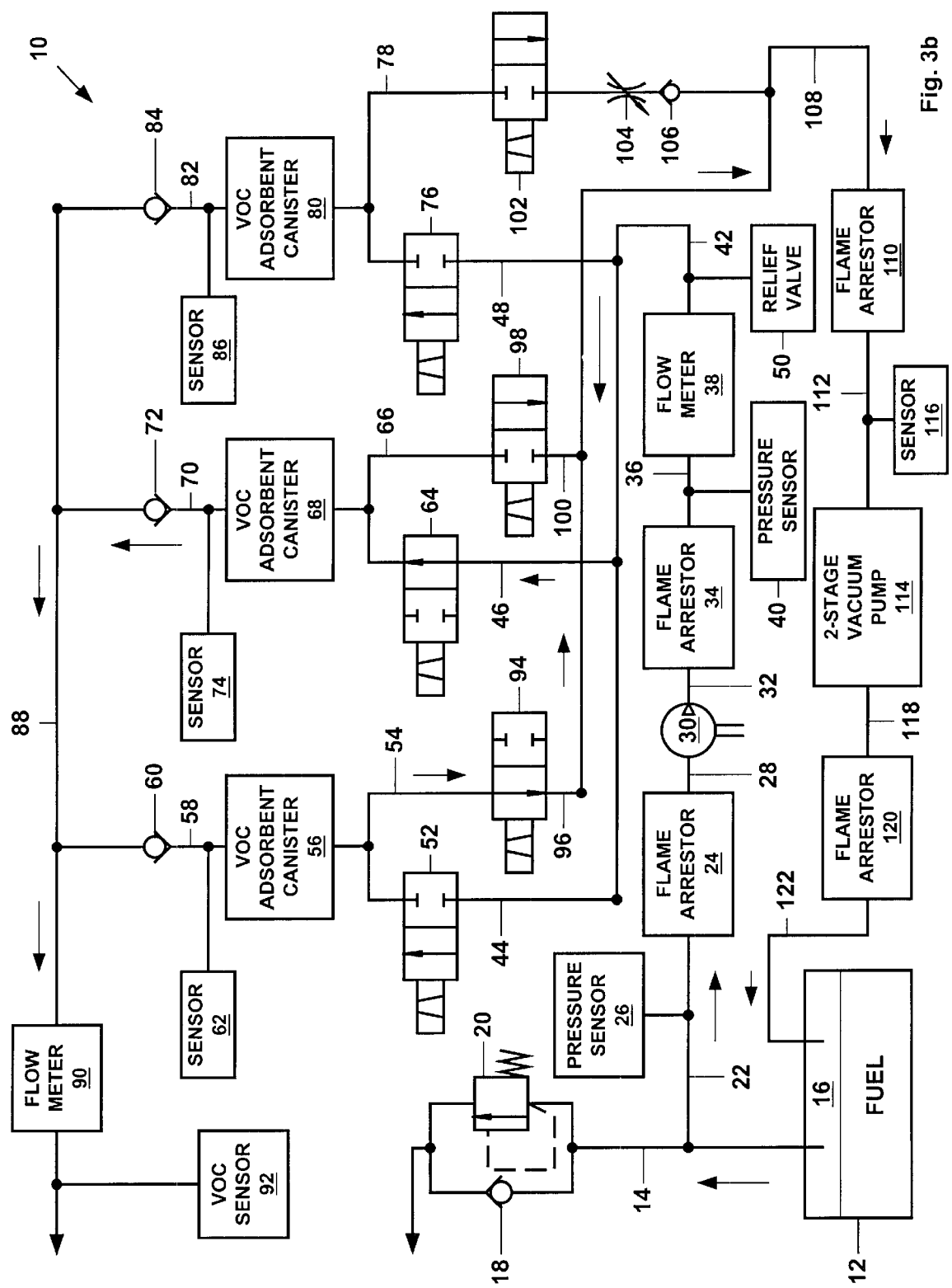
FIG. 3b is a schematic illustration of the system of FIG. 1 during operation in which the first VOC adsorbent canister is regenerated and the second VOC adsorbent canister recovers VOC vapors.

As illustrated in FIG. 3b, if the VOC adsorbent materials within the first VOC adsorbent canister 56 become saturated with VOC vapors, then the first VOC adsorbent canister 56 is regenerated and the second VOC adsorbent canister 68 is used to adsorb VOC vapors. In an exemplary embodiment, saturation of the first VOC adsorbent canister 56 can be determined by monitoring the VOC vapor content of the vapor exhausted from the canister 56 using the sensor 62 and comparing the measured value with a predetermined set point.

Once the first VOC adsorbent canister 56 becomes saturated with VOC vapors, the solenoid valve 52 is closed, the solenoid valves 64 and 94 are opened, and the vacuum pump 114 is operated to evacuate VOC-vapors from the VOC adsorbent materials within the first VOC adsorbent canister 56. The vapors within the ullage 16 are then pumped by the vapor pump 30 through the conduits 32, 36, 42, and 46, the open solenoid valve 64, and the conduit 66 to the interior of the second VOC adsorbent canister 68. The VOC vapors are then adsorbed by the VOC adsorbent materials within the second VOC adsorbent canister 68 and the non-VOC vapors are exhausted from the canister through the check valve 72 and into the atmosphere through the conduit 88. The volumetric flow rate and VOC concentration of the exhausted vapors are monitored by the flow meter 90 and the VOC sensor 92, respectively. In this manner, polluting VOC vapors are adsorbed and maintained within the second VOC adsorbent canister 68 while non-polluting non-VOC vapors are exhausted to the atmosphere. In the event of an excessive concentration of VOC vapors within the exhausted vapors, the system 10 shuts down the vapor pump 30, closes the solenoid valve 64, and generates an alarm thereby preventing the exhaust of VOC vapors from the system 10.

The VOC vapors within the first VOC adsorbent canister 56 are meanwhile exhausted through the conduit 54, the open solenoid valve 94, the conduits 96, 108, and 112 to the inlet of the vacuum pump 114. The VOC vapors are then exhausted from the outlet of the vacuum pump 114 through the conduits 118 and 122 to the ullage 16. During the exhaustion of the VOC vapors, the sensor 116 monitors the inlet pressure of the vacuum pump 114 and the VOC concentration of vapors within the conduit 112. In an exemplary embodiment, the exhaustion of the VOC vapors from the VOC adsorbent materials within the first VOC adsorbent canister 56 continues until the VOC concentration within the conduit 112 exceeds a predetermined set point value thereby indicating regeneration of the VOC adsorbent materials within the first VOC adsorbent canister 56.

Figure 3C:
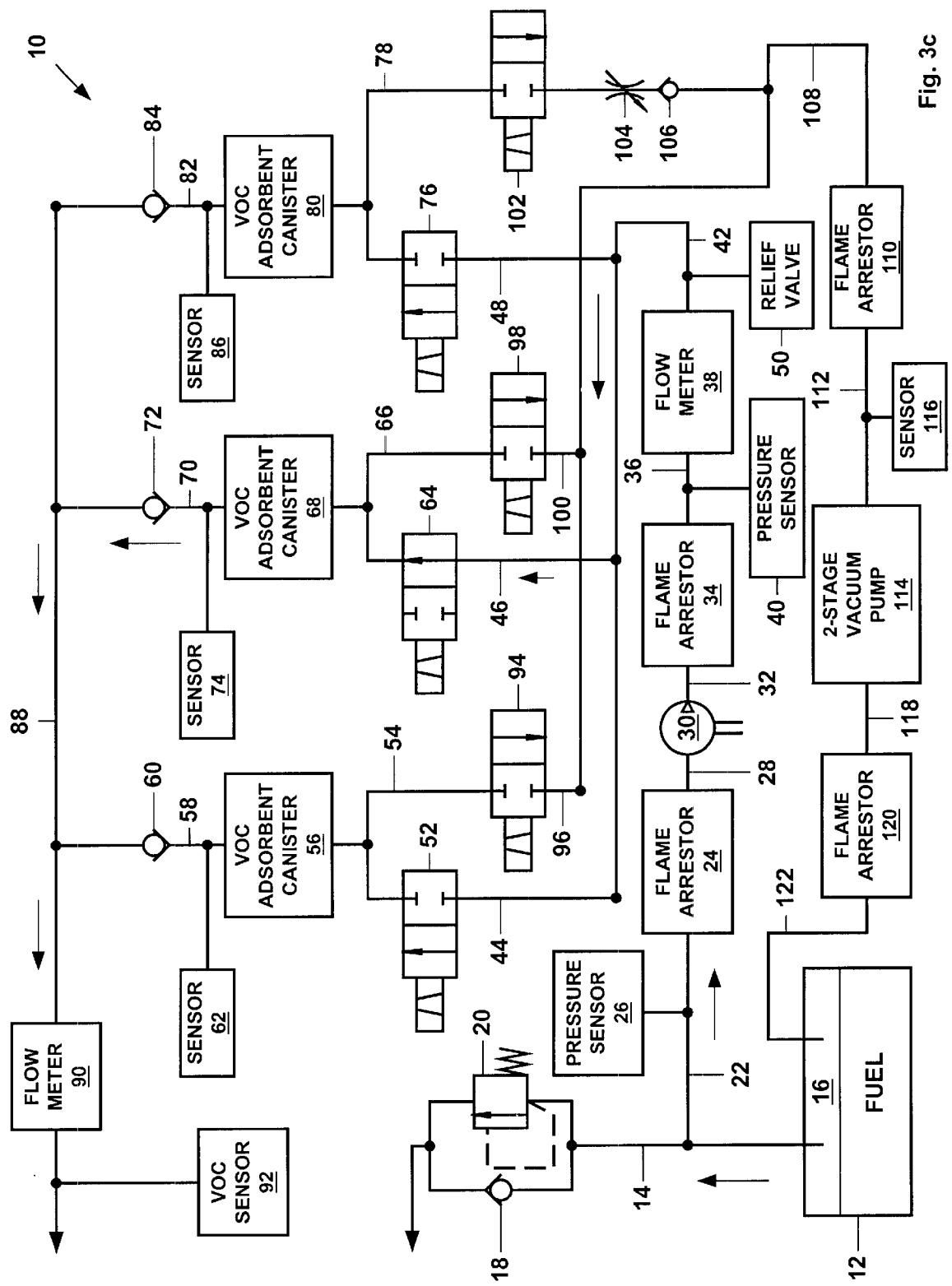
FIG. 3c is a schematic illustration of the system of FIG. 1 during operation in which the second VOC adsorbent canister recovers VOC vapors.

Once the first VOC adsorbent canister 56 has been regenerated, as illustrated in FIG. 3c, the solenoid valve 94 is closed. In this manner, the first VOC adsorbent canister 56 is regenerated and the second VOC adsorbent canister 68 is used to adsorb VOC vapors.

Figure 3D:
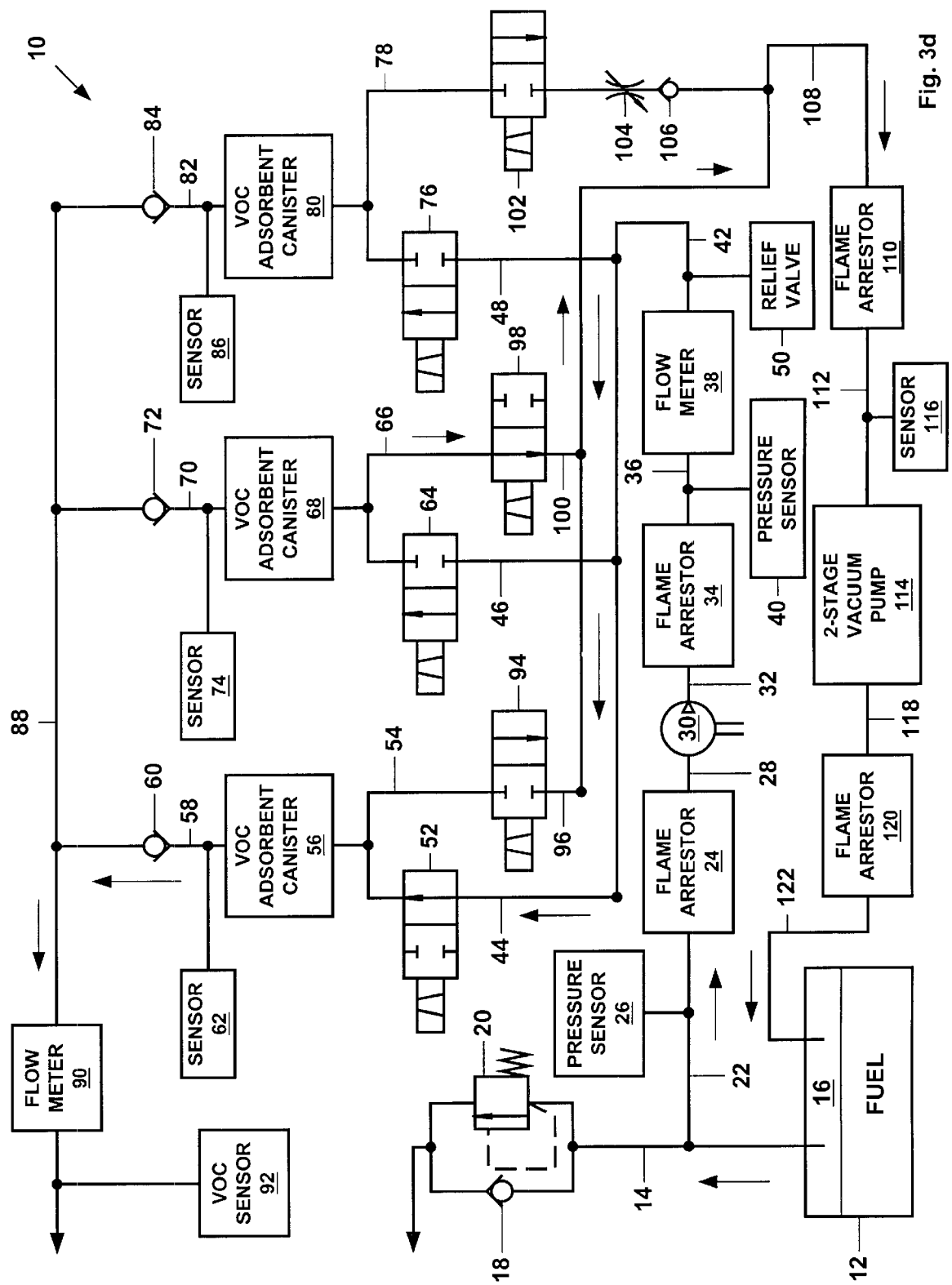
FIG. 3d is a schematic illustration of the system of FIG. 1 during operation in which the first VOC adsorbent canister recovers VOC vapors and the second VOC adsorbent canister is regenerated.

As illustrated in FIG. 3d, if the VOC adsorbent materials within the second VOC adsorbent canister 68 become saturated with VOC vapors, then the second VOC adsorbent canister 68 is regenerated and the first VOC adsorbent canister 56 is used to adsorb VOC vapors. In an exemplary embodiment, saturation of the second VOC adsorbent canister 68 can be determined by monitoring the VOC vapor content of the vapor exhausted from the canister 68 using the sensor 74 and comparing the measured value with a predetermined set point.

Once the second VOC adsorbent canister 68 becomes saturated with VOC vapors, the solenoid valve 64 is closed, the solenoid valves 52 and 98 are opened, and the vacuum pump 114 is operated to evacuate VOC-vapors from the VOC adsorbent materials within the second VOC adsorbent canister 68. The vapors within the ullage 16 are then pumped by the vapor pump 30 through the conduits 32, 36, 42, and 44, the open solenoid valve 52, and the conduit 54 to the interior of the first VOC adsorbent canister 56. The VOC vapors are then adsorbed by the VOC adsorbent materials within the first VOC adsorbent canister 56 and the non-VOC vapors are exhausted from the canister through the check valve 60 and into the atmosphere through the conduit 88. The volumetric flow rate and VOC concentration of the exhausted vapors are monitored by the flow meter 90 and the VOC sensor 92, respectively. In this manner, polluting VOC vapors are adsorbed and maintained within the first VOC adsorbent canister 56 while non-polluting non-VOC vapors are exhausted to the atmosphere. In the event of an excessive concentration of VOC vapors within the exhausted vapors, the system 10 shuts down the vapor pump 30, closes the solenoid valve 52, and generates an alarm thereby preventing the exhaust of VOC vapors from the system 10.

The VOC vapors within the second VOC adsorbent canister 68 are meanwhile exhausted through the conduit 66, the open solenoid valve 98, the conduits 100, 108, and 112 to the inlet of the vacuum pump 114. The VOC vapors are then exhausted from the outlet of the vacuum pump 114 through the conduits 118 and 122 to the ullage 16. During the exhaustion of the VOC vapors, the sensor 116 monitors the inlet pressure of the vacuum pump 114 and the VOC concentration of vapors within the conduit 112. In an exemplary embodiment, the exhaustion of the VOC vapors from the VOC adsorbent materials within the second VOC adsorbent canister 56 continues until the VOC concentration within the conduit 112 drops below a predetermined set point value thereby indicating regeneration of the VOC adsorbent materials within the second VOC adsorbent canister 68. Once the second VOC adsorbent canister 68 has been regenerated, as illustrated in FIG. 3a, the solenoid valve 98 is closed.

The alternating adsorption and regeneration cycle implemented using the first and second VOC adsorbent canisters, 56 and 68, is then repeated such that one of the canisters adsorbs VOC-vapors and the other canister is regenerated. Furthermore, because of the substantially constant pumping of vapors out of the ullage 16, the operating pressure of the ullage 16 is maintained at a slight negative pressure at all times, including the delivery of fuel into the fuel storage tank, and the exhaustion of non-VOC vapors from the system 10. In an exemplary embodiment, the operating pressure of the ullage 16 is maintained at a pressure of 1 inch of water column below atmospheric.

Figure 4A:
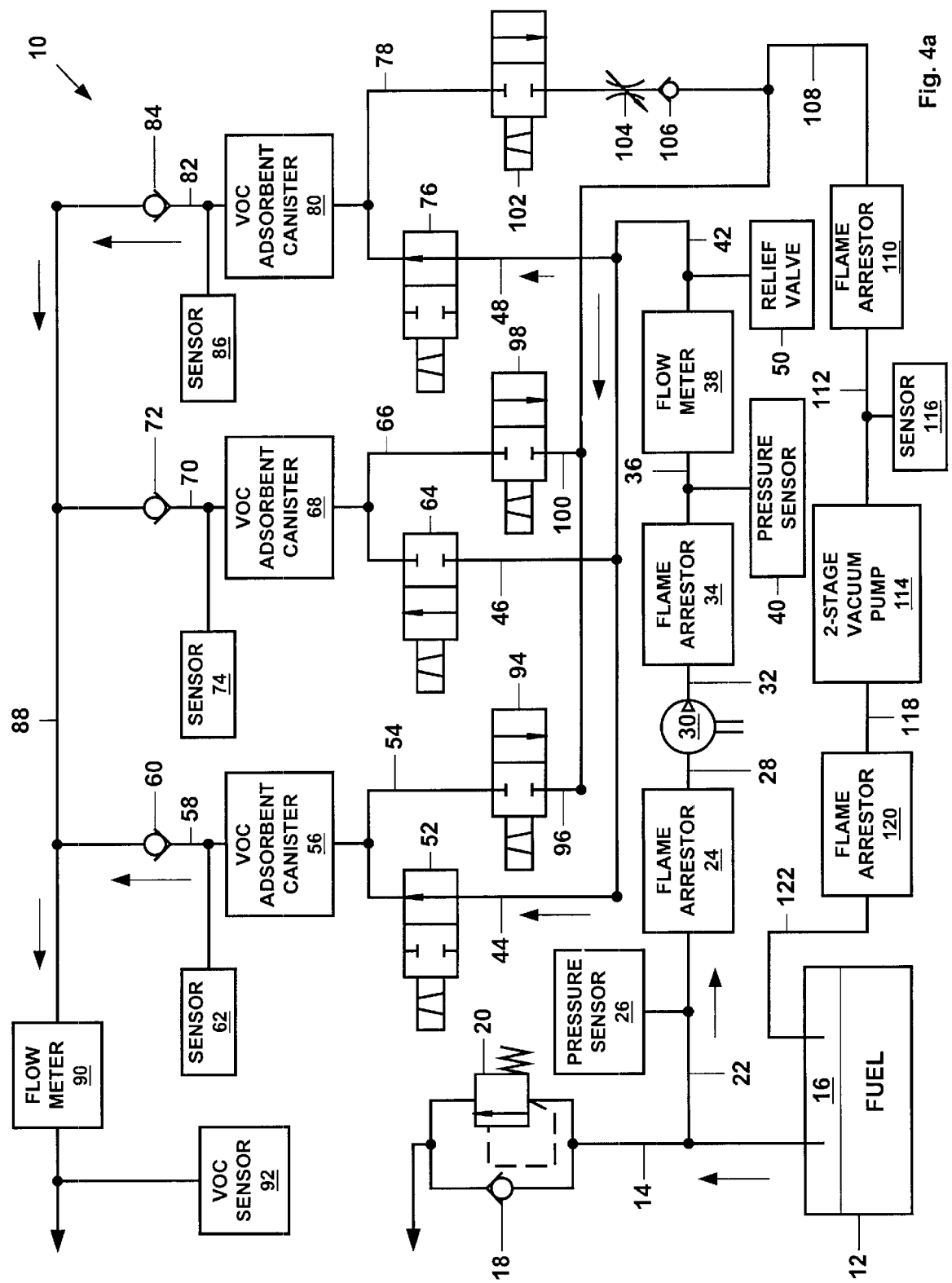
FIG. 4a is a schematic illustration of the system of FIG. 1 during operation in which the third VOC adsorbent canister recovers VOC vapors in parallel with the alternating vapor recovery cycle of the first and second VOC adsorbent canisters.

As illustrated in FIG. 4a, if the operating pressure of the ullage 16 is greater than a second higher set point pressure $P_2$, then the vapor pump 30 operates at a second higher speed in order to pump vapors from the ullage 16 at a second higher volumetric flow rate. In an exemplary embodiment, the operating pressure of the ullage 16 may increase to an elevated level during filling of the fuel storage tank 12 with fuel. The vapors are conveyed from the ullage 16 through the conduits 14, 22 and 28 to the inlet of the vapor pump 30. The vapors are then pumped from the outlet of the vapor pump 30 through the conduits 32 and 36 to the conduit 42. The outlet flow rate and operating pressure of the vapor pump 30 are monitored by the flow meter 38 and the pressure sensor 40, respectively. If the operating pressure and/or the flow rate of the outlet of the vapor pump 30 exceed predetermined alarm set points, then the system 10 shuts down the vapor pump 30, closes the solenoid valves 52 and 76, and generates an alarm in order to prevent a potentially dangerous operating condition.

The vapors are then conveyed into the first and third VOC adsorbent canisters, 56 and 80, through the open solenoid valves, 52 and 76, and the conduits, 54 and 78. Within the canisters 56 and 80, the VOC vapors are adsorbed by the VOC adsorbent material within the canisters. The non-VOC vapors are then conveyed out of the canisters, 56 and 80, through the check valves, 60 and 84, and exhausted to the atmosphere. The flow rate and VOC concentration of the exhausted vapors are monitored by the flow meter 90 and the VOC sensor 92, respectively. In this manner, polluting VOC vapors are adsorbed and maintained within the canisters, 56 and 80, while non-polluting non-VOC vapors are exhausted to the atmosphere. In the event of an excessive concentration of VOC vapors within the exhausted vapors, the system 10 shuts down the vapor pump 30, closes the solenoid valves 52 and 76, and generates an alarm thereby preventing the exhaust of VOC vapors from the system 10.

As long as the operating pressure of the ullage 16 is greater than the second higher set point pressure $P_2$, the first and second VOC adsorbent canisters, 56 and 68, are alternately used to adsorb VOC vapors in parallel with the auxiliary third VOC adsorbent canister 80 and then alternately regenerated when they become saturated with VOC vapors as described above with reference to FIGS. 3a–3d. In this manner, the system 10 can accommodate higher vapor pressure within the ullage 16. Furthermore, since the VOC vapor adsorption capacity of the auxiliary third VOC adsorbent canister 80 is greater than that of the first and second VOC adsorbent canisters, 56 and 68, it typically will not saturate during a transient condition in which the operating pressure of the ullage 16 is elevated for a short duration. Consequently, the total VOC adsorption capacity of the system 10 is greatly enhanced through the use of the auxiliary third VOC adsorbent canister 80.

Figure 4B:
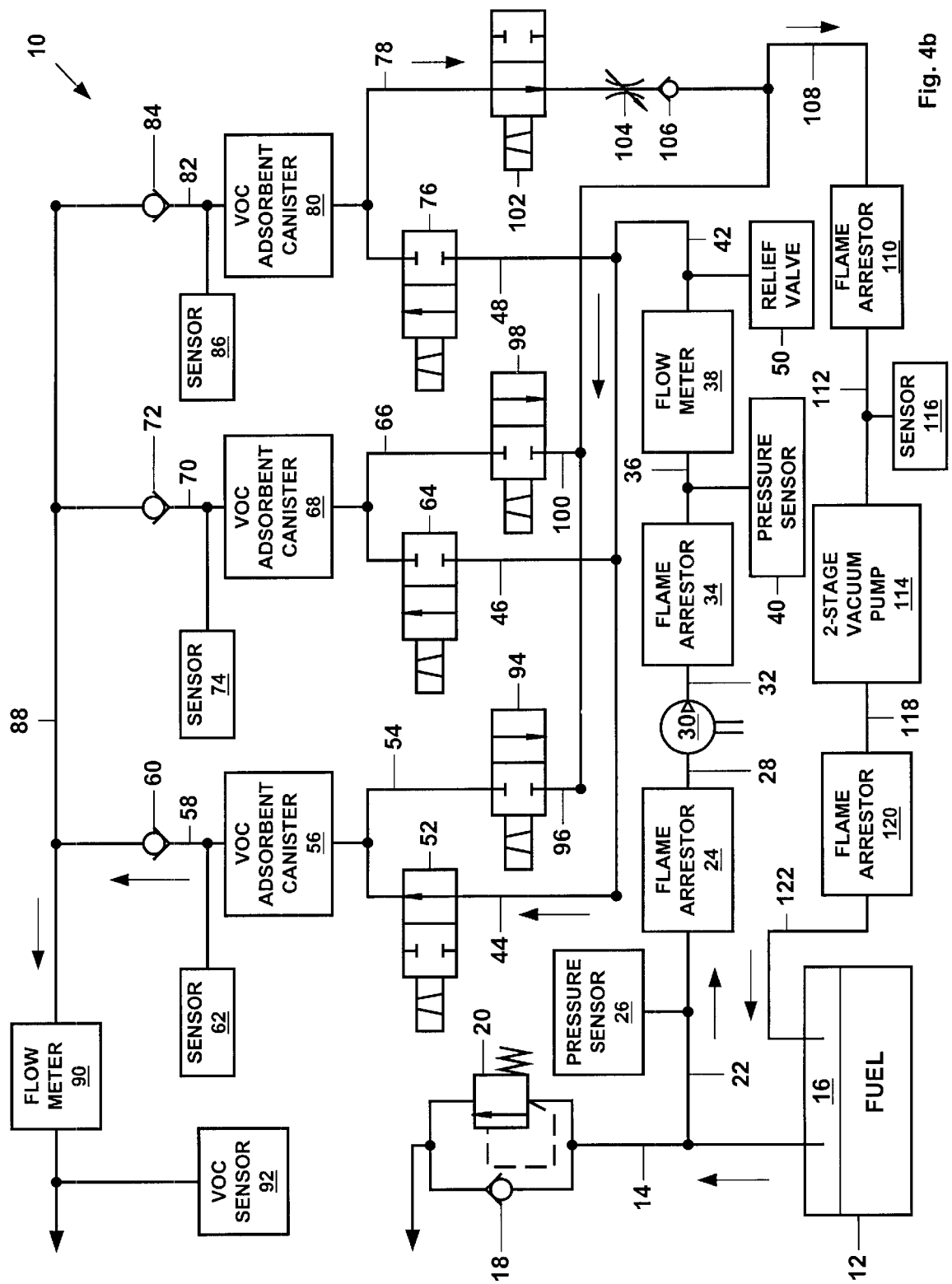
FIG. 4b is a schematic illustration of the system of FIG. 1 during operation in which the third VOC adsorbent canister is regenerated in parallel with the alternating vapor recovery cycle of the first and second VOC adsorbent canisters.

As illustrated in FIG. 4b, when the operating pressure of the ullage 16 subsequently drops below the second higher set point $P_2$, but is still above the first set point $P_1$, the first and second VOC adsorbent canisters, 56 and 68, operate as described above with reference to FIGS. 3a–3d, and the third VOC adsorbent canister 80 is regenerated. In particular, the solenoid valve 76 is closed, the solenoid valve 102 is opened, and the vacuum pump 114 is operated to exhaust VOC vapors from the VOC adsorbent material within the third VOC adsorbent canister 80.

In particular, the VOC vapors within the VOC adsorbent materials of the auxiliary third VOC adsorbent canister 80 are exhausted through the conduit 78, the open solenoid valve 102, the variable orifice 104, the check valve 106, and the conduits 108 and 112 to the inlet of the vacuum pump 114. The variable orifice 104 limits the rate at which the VOC vapors are exhausted from the auxiliary third VOC adsorbent canister 80, while the check valve 106 prevents VOC vapors being exhausted from either one of the VOC adsorbent canisters, 56 and 68, from entering the auxiliary third VOC adsorbent canister 80. In this manner, the auxiliary third VOC adsorbent canister 80 is at least partially regenerated during the regeneration of either one, or both, of the VOC adsorbent canisters, 56 and 68, and the available capacity of the vacuum pump 114 is efficiently used by the system 10. Furthermore, in this manner, the auxiliary third VOC adsorbent canister 80 may be slowly regenerated over a number of operating cycles of the first and second VOC adsorbent canisters, 56 and 68. The VOC vapors are then exhausted from the outlet of the vacuum pump 114 through the conduits 118 and 122 to the ullage 16. During the exhaustion of the VOC vapors, the sensor 116 monitors the inlet pressure of the vacuum pump 114 and the VOC concentration of vapors within the conduit 112. In an exemplary embodiment, the exhaustion of the VOC vapors from the VOC adsorbent materials within the auxiliary third VOC adsorbent canister 80 continues until the VOC concentration within the conduit 112 exceeds a predetermined set point value thereby indicating regeneration of the VOC adsorbent materials within the auxiliary third VOC adsorbent canister 80.

If the operating pressure of the ullage 16 exceeds a predetermined alarm level, then the vapor pump 30 is turned off and/or an alarm is generated by the controller 123 to indicate a potentially dangerous operating condition.

Figure 5:
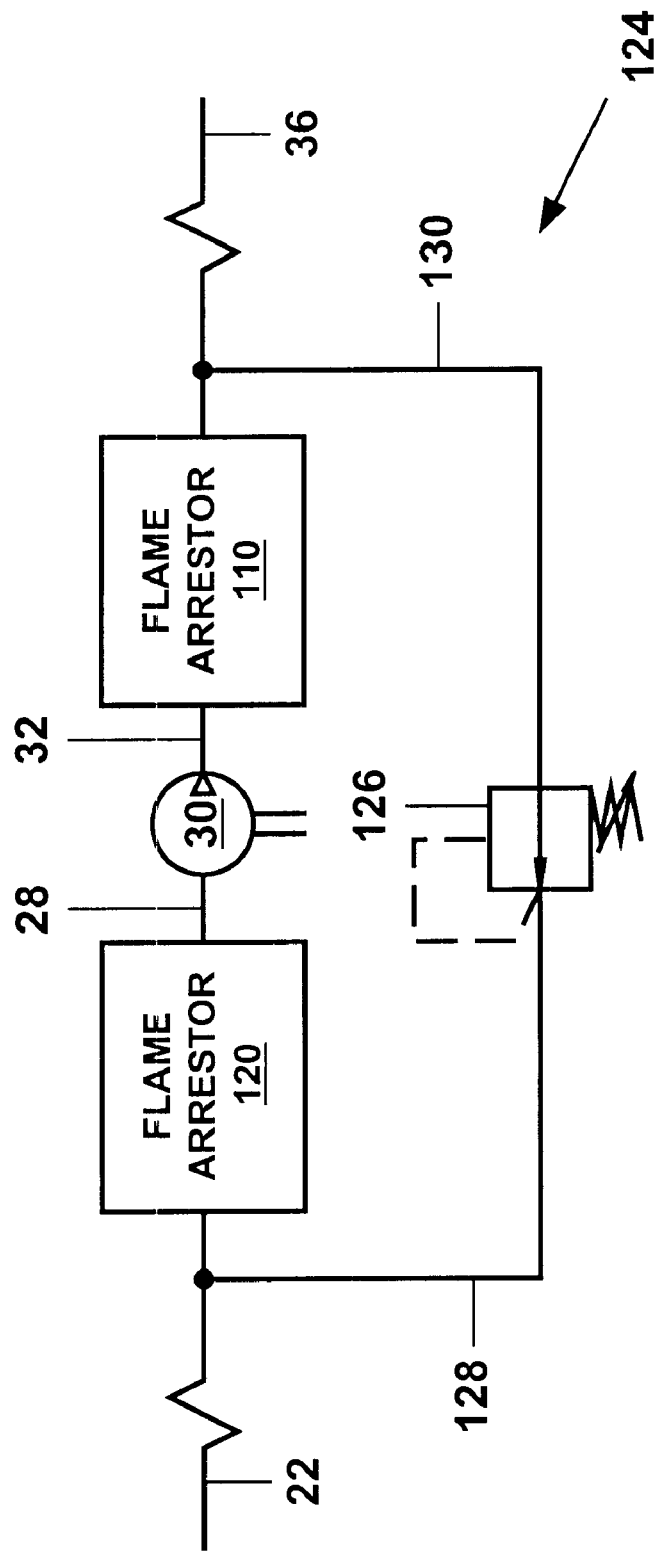
FIG. 5 is a schematic illustration of an alternate embodiment of the system of FIG. 1 including a recirculation circuit for recirculating vapors through the vapor pump.

Referring to FIG. 5, in an alternate embodiment, a recirculation circuit 124 for recirculating vapors through the vapor pump 30 that includes a pressure reducing regulator 126 that is connected to the ends of conduits 128 and 130. The other ends of the conduits 128 and 130 are connected to the conduits 22 and 36, respectively. During operation, the pressure reducing regulator 126 senses the operating pressure within the conduit 128 and, if the operating pressure within the conduit 128 is less than a predetermined value, permits vapors to pass from the conduit 130 into the conduit 128. In this manner, vapors are controllably recirculated around the vapor pump 30. Furthermore, in this manner, the effective volume of vapors pumped from the ullage 16 through the VOC adsorbent canisters, 56, 68, and 80, is increased during increases in the operating pressure of the ullage 16.

Figure 6:
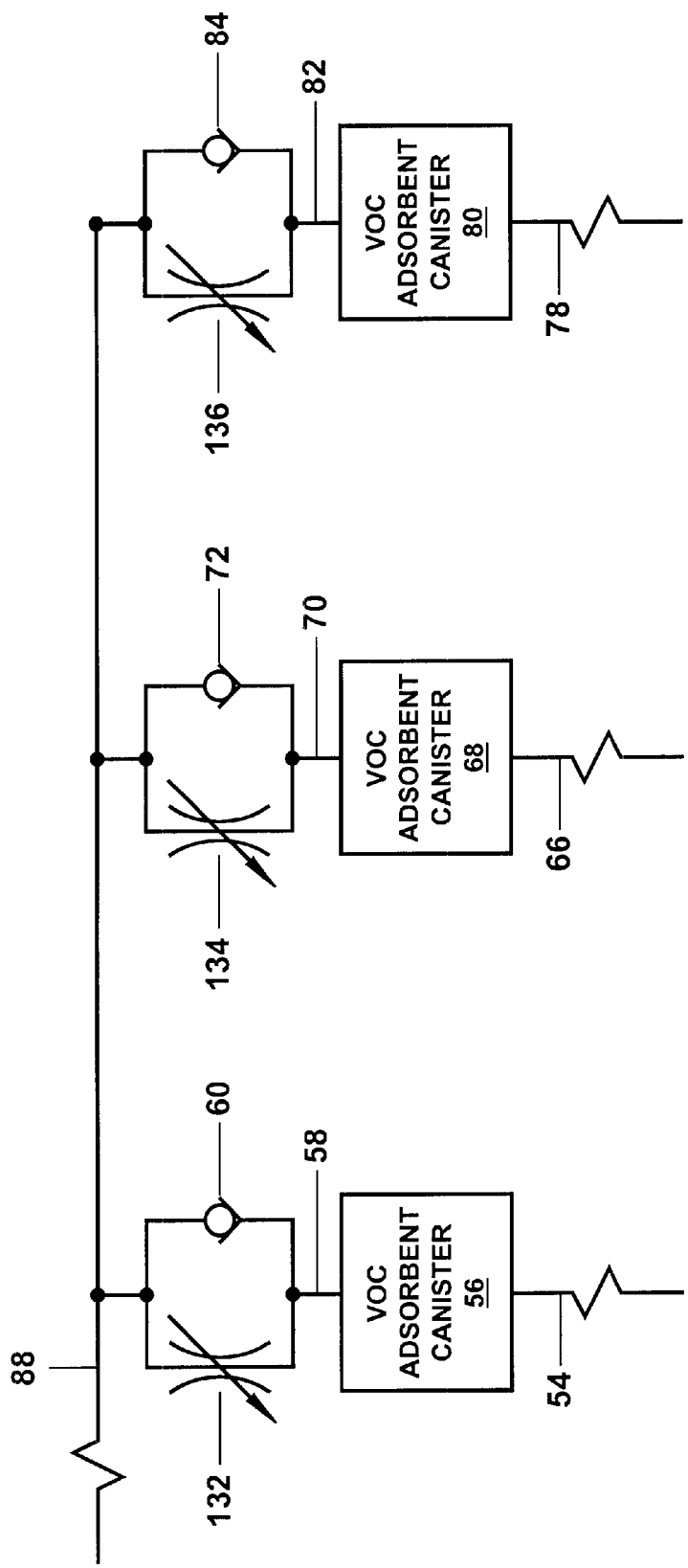
FIG. 6. is a schematic illustration of an alternate embodiment of the system of FIG. 1 including flow passages for permitting non-VOC vapors to be swept through the VOC adsorbent canisters during the regeneration cycle.

Referring to FIG. 6, in an alternate embodiment, variable orifices 132, 134, and 136 are connected between the conduits 58, 70, and 82, respectively, and the conduit 88 in parallel with the check valves 60, 72 and 84, respectively. In this manner, during the regeneration of the VOC adsorbent material within the VOC adsorbent canisters 56, 68 and 80, a controlled amount of non-VOC vapors can be recirculated and swept through the canisters in order to enhance the exhaustion of the VOC vapors from the VOC adsorbent materials within the canisters.

Figure 7:
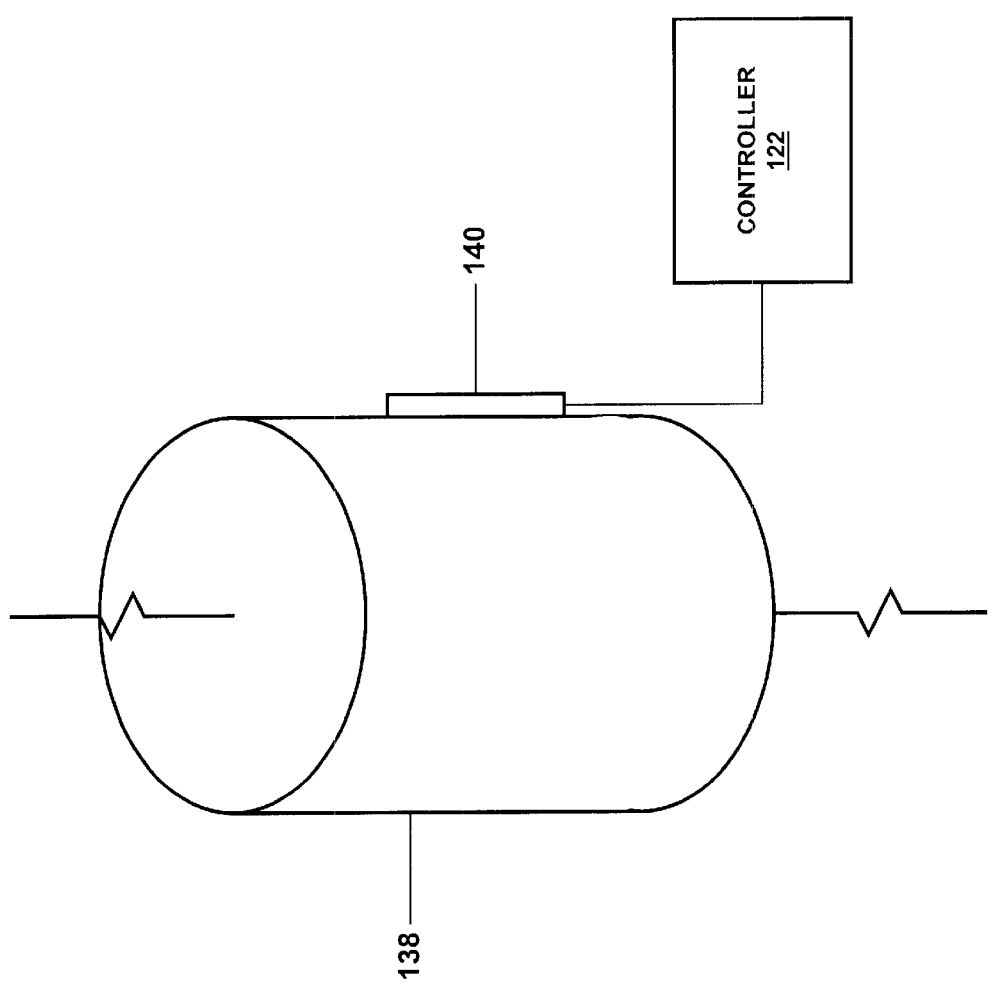
FIG. 7 is an illustration of an alternate embodiment of the system of FIG. 1 in which one or more of the VOC adsorbent canisters include strain gauges for monitoring the weight of the canisters during operation.

Referring to FIG. 7, in an alternative embodiment, one or more of the VOC adsorbent canisters 56, 68, and 80 include a housing 138 containing VOC adsorbent materials having a strain gauge 140 connected to the exterior surface of the housing 138 for monitoring the weight of the housing 138. The strain gauge 140 is further coupled to the controller 123 and is adapted to generate a signal representative of the weight of the housing 138 for processing by the controller 123. In this manner, during operation of the system 10, the controller 123 can monitor the weight of one or more of the canisters 56, 68, and 80 and thereby determine whether or not the VOC adsorbent materials within the canisters are saturated or regenerated by comparing the monitored weight with a calibrated value indicative of saturation or regeneration and/or comparing the rate of change of the weight with a calibrated value indicative of saturation or regeneration.

Figure 8:
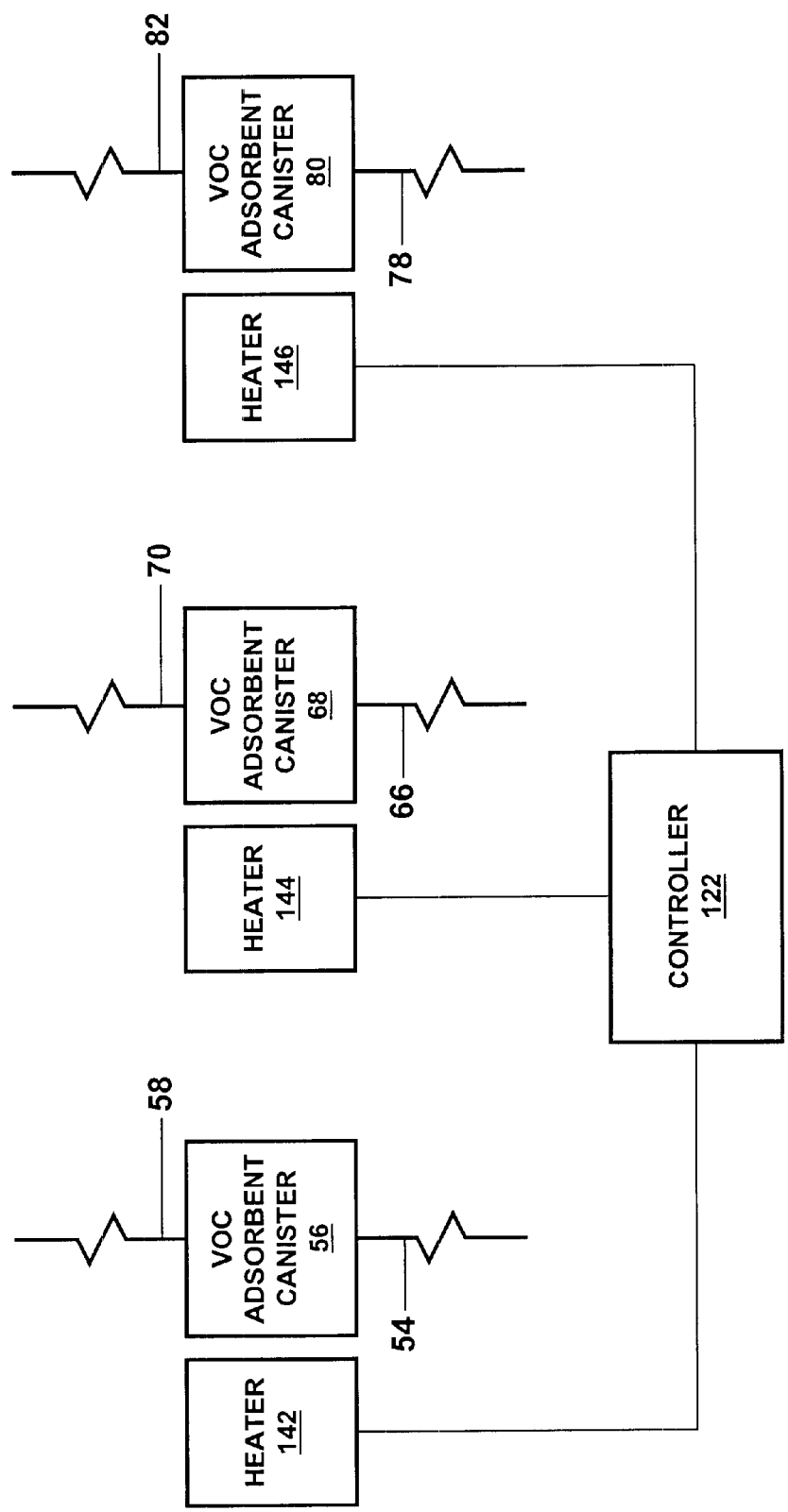
FIG. 8 is a schematic illustration of an alternate embodiment of the system of FIG. 1 in which one or more of the VOC adsorbent canisters are regenerated by using a heat source.

Referring to FIG. 8, in an alternative embodiment, first, second and third heaters 142, 144, and 146 are positioned proximate to the first, second, and third VOC adsorbent canister 56, 68, and 80, respectively, and operably coupled to the controller 123 for controllably regenerating the VOC adsorbent materials within the first, second and third VOC adsorbent canisters. In this manner, during operation of the system 10, the regeneration of the VOC adsorbent materials within the VOC adsorbent canisters may be provided by the heaters 142, 144, and 146, or in combination with the vacuum pump 114.

The present embodiments of the invention provide a number of advantages. For example, the use of a pair of VOC adsorbent canisters that are alternately used to adsorb VOC vapors and regenerated provides substantially constant adsorption of VOC vapors from the ullage. Moreover, the use of a vacuum pump to exhaust VOC vapors from the saturated VOC adsorbent canisters and thereby regenerate the canisters minimizes the amount of vapor that is reintroduced into the ullage during the regeneration process. In this manner, the operating pressure of the ullage is minimally increased during the regeneration process. Furthermore, the use of a pair of VOC adsorbent canisters to recover VOC vapors during normal operating conditions by alternating between vapor recovery and regeneration provides an efficient and cost effective system for VOC vapor recovery. In addition, the additional parallel use of a third VOC adsorbent canister having increased VOC adsorbing capacity permits the system to effectively and efficiently handle increased operating pressures within the ullage. Also, the ability to augment the regeneration of the VOC adsorbent canisters by including heaters increases the rate at which the VOC adsorbent canisters may be regenerated. Finally, sensing the level of saturation of the VOC adsorbent canisters by weighing the canisters provides a reliable method of monitoring the saturation level of the VOC adsorbent canisters that does not rely upon direct measurement of VOC vapor concentrations.

It is understood that variations may be made in the foregoing without departing from the scope of the invention. For example, the pressure sensor 40 could also measure the composition of the vapors within the conduit 36 in order to determine, for example, the concentration of the VOC and non-VOC vapors. In addition, the saturation point of the VOC adsorbent canisters, 56, 68, and 80, can be determined by measuring the time the VOC adsorbent canisters are used to adsorb VOC vapors and comparing the elapsed time with a predetermined calibration value and/or by measuring the vapor pressure within the inlet and/or exhaust conduits coupled to the corresponding VOC adsorbent canisters and comparing the measured vapor pressure with a predetermined set point. Moreover, the first and second VOC adsorbent canisters, 56 and 68, can alternate between adsorption and regeneration using a fixed duty cycle in which each VOC adsorbent canister adsorbs VOC vapors for a predetermined time period and then is regenerated for a predetermined time period. Furthermore, the completion of a regeneration cycle for one or more of the VOC adsorbent canisters, 56, 68, and 80, can be indicated by monitoring the elapsed time of the regeneration cycle and/or the weight of the canisters during the regeneration cycle and comparing the elapsed time and/or weight with predetermined set points, by monitoring the vapor pressure within one or more of the conduits 112, 58, 70, and/or 82 pressure using the sensors 116, 62, 74, and/or 86 and comparing the monitored pressure with predetermined set points, and/or by determining that the other adsorbing canisters have become saturated using any one of the method described within the present disclosure. Moreover, the end of a regeneration cycle for one or more of the VOC adsorbent canisters, 56, 68, and 80, may or may not initiate the use of the newly regenerated canister for adsorption. In addition, a variable displacement vapor pump may be used to provide pumping of vapors from the ullage 16 at a range of volumetric flow rates. Furthermore, one or more of the solenoid valves 52, 64, 76, 94, 98, and 102 could be replaced, for example, with ball valves or poppet valves. In addition, one or more of the flame arrestors 24, 34, 110 and 120, flow meters 38 and 90, and sensor 116 could be omitted. Furthermore, the sensors 62, 74, and 86 may be directly coupled to the interiors of the corresponding VOC adsorbent canisters 56, 68, and 80 and/or the sensors 62, 74 and 86 may monitor the vapor pressure within the corresponding VOC adsorbent canisters and thereby indicate the level of saturation or regeneration of the canisters. In addition, the orifice 104 may be a fixed orifice or a variable orifice. Furthermore, the sensor 116 may include an internal pump for facilitating the monitoring of the VOC concentration of vapors. In addition, the flow meter 38 may be omitted. Moreover, the conduit 122 may extend to the bottom of the fuel storage tank 12, or, alternatively, it may extend to a diffuser positioned in the ullage 16. Finally, a load cell may be used instead of, or in addition to, the strain gauge 140 for measuring the weight of the housing 138.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A method for recovering vapors from a fuel storage tank having a ullage including VOC vapors and non-VOC vapors, comprising:

monitoring the pressure in the fuel storage tank ullage;

withdrawing vapors from the fuel storage tank ullage;

feeding the vapors through a first canister including a VOC adsorbing material and permitting non-VOC vapors to exit the first canister; and exhausting substantially all non-VOC vapors from the first canister to the atmosphere; and if the VOC adsorbent material of the first canister becomes saturated, feeding the vapors through a second canister including a VOC adsorbing material and permitting non-VOC vapors to exit the second canister;

exhausting substantially all of the non-VOC vapors from the second canister to the atmosphere;

regenerating the saturated VOC adsorbent material of the first canister by evacuating the VOC vapors from the saturated VOC adsorbent material of the first canister into the fuel storage tank ullage; and determining if the VOC adsorbing material of the first canister is saturated with VOC vapors by monitoring the concentration of VOC vapors.

2. The method of claim 1, further including:

if the VOC adsorbent material of the second canister becomes saturated, feeding the vapors through the first canister and permitting non-VOC vapors to exit the first canister;

exhausting substantially all of the non-VOC vapors from the first canister to the atmosphere; and regenerating the saturated VOC adsorbent material of the second canister by evacuating the VOC vapors from the saturated VOC adsorbent material of the second canister into the fuel storage tank ullage.

3. The method of claim 2, further including:

determining if the VOC adsorbing material of the second canister is saturated with VOC vapors by weighing the second canister.

4. The method of claim 2, further including: determining if the VOC adsorbent material of the second canister is saturated by monitoring the elapsed time.

5. The method of claim 2, further including:

determining if the VOC adsorbent material of the second canister is saturated by monitoring the vapor pressure.

6. A method for recovering vapors from a fuel storage tank having a ullage including VOC vapors and non-VOC vapors, comprising:

monitoring the pressure in the fuel storage tank ullage;

withdrawing vapors from the fuel storage tank ullage;

feeding the vapors through a first canister including a VOC adsorbing material and permitting non-VOC vapors to exit the first canister;

exhausting substantially all non-VOC vapors from the first canister to the atmosphere; and if the pressure of the fuel storage tank ullage exceeds a predetermined level, feeding vapors through an auxiliary canister including a VOC adsorbing material and permitting non-VOC vapors to exit the auxiliary canister; and exhausting substantially all of the non-VOC vapors from the auxiliary canister to the atmosphere.

7. The method of claim 6, further including:

if the pressure of the fuel storage tank ullage exceeds a predetermined level, increasing the rate at which vapors are withdrawn from the fuel storage tank ullage.

8. The method of claim 6, further including:

if the VOC adsorbent material of the first canister becomes saturated, feeding vapors through a second canister including a VOC adsorbing material and permitting non-VOC vapors to exit the second canister;

exhausting substantially all of the non-VOC vapors from the second canister to the atmosphere; and regenerating the saturated VOC adsorbent material of the first canister by evacuating the VOC vapors from the saturated VOC adsorbent material of the first canister into the fuel storage tank ullage.

9. The method of claim 8, further including:

if the VOC adsorbent material of the second canister becomes saturated, feeding the vapors through the first canister and permitting non-VOC vapors to exit the first canister;

exhausting substantially all of the non-VOC vapors from the first canister to the atmosphere; and regenerating the saturated VOC adsorbent material of the second canister by evacuating the VOC vapors from the saturated VOC adsorbent material of the second canister into the fuel storage tank ullage.

10. The method of claim 6, further including:

if the pressure of the fuel storage tank ullage is less than the predetermined level, regenerating the VOC adsorbent material of the auxiliary canister by evacuating the VOC vapors from the VOC adsorbent material of the auxiliary canister.

11. The method of claim 10, further including:

if the VOC adsorbent material of the first canister becomes saturated, feeding the vapors through a second canister including a VOC adsorbing material and permitting non-VOC vapors to exit the second canister;

exhausting substantially all of the non-VOC vapors from the second canister to the atmosphere; and regenerating the saturated VOC adsorbent material of the first canister by evacuating the VOC vapors from the saturated VOC adsorbent material of the first canister into the fuel storage tank ullage.

12. The method of claim 11, wherein the VOC adsorbent material of the auxiliary canister is at least partially regenerated during the regeneration of the saturated VOC adsorbent material of the first canister.

13. The method of claim 11, further including:

if the VOC adsorbent material of the second canister becomes saturated, feeding the vapors through the first canister and permitting non-VOC vapors to exit the first canister;

exhausting substantially all of the non-VOC vapors from the first canister to the atmosphere; and regenerating the saturated VOC adsorbent material of the second canister by evacuating the VOC vapors from the saturated VOC adsorbent material of the second canister into the fuel storage tank ullage.

14. The method of claim 13, wherein the VOC adsorbent material of the auxiliary canister is at least partially regenerated during the regeneration of the saturated VOC adsorbent material of the second canister.

15. The method of claim 10, further including:

after a predetermined first period of time, feeding the vapors through a second canister including a VOC adsorbing material and permitting non-VOC vapors to exit the second canister;

exhausting substantially all of the non-VOC vapors from the second canister to the atmosphere; and regenerating the VOC adsorbent material of the first canister by evacuating the VOC vapors from the VOC adsorbent material of the first canister into the fuel storage tank ullage.

16. The method of claim 15, wherein the VOC adsorbent material of the auxiliary canister is at least partially regenerated during the regeneration of the saturated VOC adsorbent material of the first canister.

17. The method of claim 15, further including:

after a predetermined second period of time, feeding the vapors through the first canister and permitting non-VOC vapors to exit the first canister;

exhausting substantially all of the non-VOC vapors from the first canister to the atmosphere; and regenerating the VOC adsorbent material of the second canister by evacuating the VOC vapors from the VOC adsorbent material of the second canister into the fuel storage tank ullage.

18. The method of claim 17, wherein the VOC adsorbent material of the auxiliary canister is at least partially regenerated during the regeneration of the saturated VOC adsorbent material of the second canister.

19. The method of claim 6, further including:

after a predetermined first period of time, feeding vapors through a second canister including a VOC adsorbing material and permitting non-VOC vapors to exit the second canister;

exhausting substantially all of the non-VOC vapors from the second canister to the atmosphere; and regenerating the VOC adsorbent material of the first canister by evacuating the VOC vapors from the VOC adsorbent material of the first canister into the fuel storage tank ullage.

20. The method of claim 19, further including:

after a predetermined second period of time, feeding the vapors through the first canister and permitting non-VOC vapors to exit the first canister;

exhausting substantially all of the non-VOC vapors from the first canister to the atmosphere; and regenerating the VOC adsorbent material of the second canister by evacuating the VOC vapors from the VOC adsorbent material of the second canister into the fuel storage tank ullage.

21. The method of claim 6, further including:

generating an alarm if the monitored pressure of the fuel storage tank ullage exceeds an alarm limit.

22. The method of claim 6, further including:

monitoring the flow rate of the withdrawn vapors.

23. The method of claim 22, wherein, if the flow rate of the withdrawn vapors exceeds a predetermined alarm set point, then stopping the withdrawal of the vapors and generating an alarm.

24. The method of claim 6, further including:

monitoring the operating pressure of the withdrawn vapors.

25. The method of claim 24, wherein, if the operating pressure of the withdrawn vapors exceeds a predetermined alarm level, then stopping the withdrawal of the vapors and generating an alarm.

26. The method of claim 6, further including:

monitoring the flow rate of vapors exhausted to the atmosphere.

27. The method of claim 6, further including:

sensing the concentration of VOC-vapors exhausted to the atmosphere.

28. The method of claim 27, wherein, if the concentration of VOC-vapors exhausted to the atmosphere exceeds a predetermined alarm level, then stopping the withdrawal of the vapors and generating an alarm.

29. The method of claim 6, further including:

if the VOC adsorbent material of the first canister becomes saturated, feeding vapors through a second canister including a VOC adsorbing material and permitting non-VOC vapors to exit the second canister;

exhausting substantially all of the non-VOC vapors from the second canister to the atmosphere; and regenerating the saturated VOC adsorbent material of the first canister by heating and evacuating the VOC vapors from the saturated VOC adsorbent material of the first canister into the fuel storage tank ullage.

30. The method of claim 29, further including:
if the VOC adsorbent material of the second canister becomes saturated, feeding the vapors through the first canister and permitting non-VOC vapors to exit the first canister;
exhausting substantially all of the non-VOC vapors from the first canister to the atmosphere; and
regenerating the saturated VOC adsorbent material of the second canister by heating and evacuating the VOC vapors from the saturated VOC adsorbent material of the second canister into the fuel storage tank ullage.

31. The method of claim 6, further including:
if the pressure of the fuel storage tank ullage is less than the predetermined level, regenerating the VOC adsorbent material of the auxiliary canister by heating and evacuating the VOC vapors from the VOC adsorbent material of the auxiliary canister.

32. The method of claim 31, further including:
if the VOC adsorbent material of the first canister becomes saturated, feeding the vapors through a second canister including a VOC adsorbing material and permitting non-VOC vapors to exit the second canister;
exhausting substantially all of the non-VOC vapors from the second canister to the atmosphere; and
regenerating the saturated VOC adsorbent material of the first canister by heating and evacuating the VOC vapors from the saturated VOC adsorbent material of the first canister into the fuel storage tank ullage.

33. The method of claim 31, further including:
if the VOC adsorbent material of the second canister becomes saturated, feeding the vapors through the first canister and permitting non-VOC vapors to exit the first canister;
exhausting substantially all of the non-VOC vapors from the first canister to the atmosphere; and
regenerating the saturated VOC adsorbent material of the second canister by heating and evacuating the VOC vapors from the saturated VOC adsorbent material of the second canister into the fuel storage tank ullage.

34. A method for recovering vapors from a fuel storage tank having a ullage including VOC vapors and non-VOC vapors, comprising:
monitoring the pressure in the fuel storage tank ullage;
withdrawing vapors from the fuel storage tank ullage;
feeding the vapors through a first canister including a VOC adsorbing material and permitting non-VOC vapors to exit the first canister;
exhausting substantially all non-VOC vapors from the first canister to the atmosphere; and
if the monitored pressure in the fuel storage tank ullage exceeds a first set point, then withdrawing vapors from the fuel storage tank at a first rate; and
if the monitored pressure in the fuel storage tank ullage exceeds a second set point, then withdrawing vapors from the fuel storage tank at a second rate;
wherein the first set point is less than the second set point; and wherein the first withdrawal rate is less than the second withdrawal rate.

35. The method of claim 34, further including:
if the VOC adsorbent material of the first canister becomes saturated, feeding the vapors through a second canister including a VOC adsorbing material and permitting non-VOC vapors to exit the second canister;
exhausting substantially all of the non-VOC vapors from the second canister to the atmosphere; and
regenerating the saturated VOC adsorbent material of the first canister by evacuating the VOC vapors from the saturated VOC adsorbent material of the first canister into the fuel storage tank ullage.

36. The method of claim 35, further including:
if the VOC adsorbent material of the second canister becomes saturated, feeding the vapors through the first canister and permitting non-VOC vapors to exit the first canister;
exhausting substantially all of the non-VOC vapors from the first canister to the atmosphere; and
regenerating the saturated VOC adsorbent material of the second canister by evacuating the VOC vapors from the saturated VOC adsorbent material of the second canister into the fuel storage tank ullage.

37. The method of claim 34, further including:
if the pressure of the fuel storage tank ullage exceeds the second set point, feeding vapors through an auxiliary canister including a VOC adsorbing material and permitting non-VOC vapors to exit the auxiliary canister; and
exhausting substantially all of the non-VOC vapors from the auxiliary canister to the atmosphere.

38. The method of claim 37, further including:
if the VOC adsorbent material of the first canister becomes saturated, feeding vapors through a second canister including a VOC adsorbing material and permitting non-VOC vapors to exit the second canister;
exhausting substantially all of the non-VOC vapors from the second canister to the atmosphere; and
regenerating the saturated VOC adsorbent material of the first canister by evacuating the VOC vapors from the saturated VOC adsorbent material of the first canister into the fuel storage tank ullage.

39. The method of claim 38, further including:
if the VOC adsorbent material of the second canister becomes saturated, feeding the vapors through the first canister and permitting non-VOC vapors to exit the first canister;
exhausting substantially all of the non-VOC vapors from the first canister to the atmosphere; and
regenerating the saturated VOC adsorbent material of the second canister by evacuating the VOC vapors from the saturated VOC adsorbent material of the second canister into the fuel storage tank ullage.

40. The method of claim 37, further including:
if the pressure of the fuel storage tank ullage is less than the second set point, regenerating the VOC adsorbent material of the auxiliary canister by evacuating the VOC vapors from the VOC adsorbent material of the auxiliary canister.

41. A method of monitoring a VOC adsorbent canister containing VOC adsorbent materials for use in a vapor recovery system for a fuel storage tank to determine whether the VOC adsorbent materials within the VOC adsorbent canister have become saturated with VOC vapors, comprising:
monitoring the weight of the VOC adsorbent canister; and
comparing the weight of the VOC adsorbent canister with a predetermined calibration amount;
wherein comparing the weight includes comparing the change of the weight with a predetermined calibration amount of change.

42. A vapor recovery system for a fuel storage tank having an ullage including VOC vapors and non-VOC vapors, comprising:

an ullage pressure sensor coupled to the ullage for sensing the operating pressure of the ullage;

a vapor pump coupled to the ullage for pumping vapors from the ullage;

a vacuum pump coupled to the ullage for exhausting vapors into the ullage;

a first canister containing a VOC adsorbent material for adsorbing VOC-vapors;

a second canister containing a VOC adsorbent material for adsorbing VOC-vapors;

an atmospheric vent coupled to the first and second canisters for conveying vapors exhausted by the canisters to the atmosphere;

a first recovery valve coupled between the vapor pump and the first canister for controlling the flow of vapors from the vapor pump to the first canister;

a second recovery valve coupled between the vapor pump and the second canister for controlling the flow of vapors from the vapor pump to the second canister;

a first regeneration valve coupled between the vacuum pump and the first canister for controlling the exhaustion of vapors from the first canister by the vacuum pump;

a second regeneration valve coupled between the vacuum pump and the second canister for controlling the exhaustion of vapors from the second canister by the vacuum pump; and a controller coupled to the pressure sensor, the vapor pump, the vacuum pump, the recovery valves, and the regeneration valves;

wherein, if the sensed operating pressure of the ullage exceeds a first set point, the controller is adapted to operate the vapor pump to pump vapors out of the ullage, and operate the first recovery valve to permit vapors pumped by the vapor pump to flow through the first canister; and wherein substantially all of the VOC-vapors are adsorbed within the first canister and substantially all of the non-VOC vapors are exhausted from the first canister to the atmosphere through the atmospheric vent.

43. The system of claim 42, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

44. The system of claim 43, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

45. The system of claim 42 further including:

an auxiliary canister containing a VOC adsorbent material coupled to the atmospheric vent;

an auxiliary recovery valve coupled between the vapor pump and the third canister for controlling the flow of vapors from the vapor pump to the auxiliary canister; and an auxiliary regeneration valve coupled between the vacuum pump and the auxiliary canister for controlling the exhaustion of vapors from the auxiliary canister by the vacuum pump;

wherein the controller is coupled to the auxiliary recovery valve, and the auxiliary regeneration valve; and wherein, if the sensed operating pressure of the ullage exceeds a second set point, the controller is adapted to operate the auxiliary recovery valve to permit vapors pumped by the vapor pump to flow through the auxiliary canister;

wherein substantially all of the VOC-vapors are adsorbed within the auxiliary canister and substantially all of the non-VOC vapors are exhausted from the auxiliary canister to the atmosphere through the atmospheric vent; and wherein the first set point is less than the second set point.

46. The system of claim 45, wherein if the sensed operating pressure of the ullage exceeds the second set point, the controller is adapted to increase the volumetric flow rate of the vapor pump.

47. The system of claim 45, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

48. The system of claim 47, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

49. The system of claim 45, wherein, if the sensed operating pressure of the ullage is less than the second set point, the controller is adapted to operate the auxiliary recovery valve to prevent the flow of vapors pumped by the vapor pump through the auxiliary canister; operate the auxiliary regeneration valve to permit VOC-vapors within the auxiliary canister to be exhausted by the vacuum pump; and operate the vacuum pump to evacuate the VOC vapors within the auxiliary canister to the ullage.

50. The system of claim 49, further including:

an orifice coupled between the auxiliary regeneration valve and the vacuum pump for limiting the rate of exhaustion of vapors from the auxiliary canister by the vacuum pump.

51. The system of claim 49, further including:

a check valve coupled between the auxiliary regeneration valve and the vacuum pump for preventing vapors from entering the auxiliary canister.

52. The system of claim 45, wherein, if the sensed operating pressure of the ullage is less than the second set point, the controller is adapted to reduce the volumetric flow rate of the vapor pump.

53. The system of claim 45, further including:

an auxiliary recirculation flow passage coupled to the auxiliary VOC canister for recirculating non-VOC vapors through the auxiliary VOC adsorbent canister.

54. The system of claim 45, further including:

a first VOC-vapor sensor coupled to the first canister for sensing the level of VOC-vapor saturation of the VOC adsorbent materials of the first canister;

a second VOC-vapor sensor coupled to the second canister for sensing the level of VOC-vapor saturation of the VOC adsorbent materials of the second canister; and an auxiliary VOC-vapor sensor coupled to the auxiliary canister for sensing the level of VOC-vapor saturation of the VOC adsorbent materials of the auxiliary canister.

55. The system of claim 54, wherein the VOC-vapor sensors sense the concentration of VOC-vapors.

56. The system of claim 54, wherein the VOC-vapor sensors sense the weight of the canisters.

57. The system of claim 54, wherein the VOC-vapor sensors sense the vapor pressure.

58. The system of claim 54, wherein, if the sensed operating pressure of the ullage exceeds the second set point, the controller is adapted to increase the volumetric flow rate of the vapor pump.

59. The system of claim 54, wherein, if the first VOC-vapor sensor indicates that the first canister is saturated, the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

60. The system of claim 59, wherein, if the second VOC-vapor sensor indicates that the second canister is saturated, the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

61. The system of claim 54, wherein, if the sensed operating pressure of the ullage is less than the second set point, the controller is adapted to operate the auxiliary recovery valve to prevent the flow of vapors pumped by the vapor pump through the auxiliary canister; operate the auxiliary regeneration valve to permit VOC-vapors within the auxiliary canister to be exhausted by the vacuum pump; and operate the vacuum pump to evacuate the VOC vapors within the auxiliary canister to the ullage.

62. The system of claim 61, wherein, if the sensed operating pressure of the ullage is less than the second set point, the controller is adapted to reduce the volumetric flow rate of the vapor pump.

63. The system of claim 45, wherein, after the passage of a predetermined first time period, the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

64. The system of claim 63, wherein, after the passage of a predetermined second time period, the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

65. The system of claim 45, wherein the first canister includes:

a first housing containing the VOC adsorbent material;

a first strain gauge coupled to the first housing and the controller;

wherein the second canister includes:

a second housing containing the VOC adsorbent material; and a second strain gauge coupled to the second housing and the controller; and wherein the auxiliary canister includes:

an auxiliary housing containing the VOC adsorbent material; and an auxiliary strain gauge coupled to the auxiliary housing and the controller.

66. The system of claim 45, wherein the first canister includes:

a first housing containing the VOC adsorbent material;

a first load cell coupled to the first housing and the controller;

wherein the second canister includes:

a second housing containing the VOC adsorbent material; and a second load cell coupled to the second housing and the controller; and wherein the auxiliary canister includes:

an auxiliary housing containing the VOC adsorbent material; and an auxiliary load cell coupled to the auxiliary housing and the controller.

67. The system of claim 45, further including:

a first heater operably coupled to the first canister and the controller for regenerating the VOC adsorbent materials within the first canister;

a second heater operably coupled to the second canister and the controller for regenerating the VOC adsorbent materials within the second canister; and an auxiliary heater operably coupled to the auxiliary canister and the controller for regenerating the VOC adsorbent materials within the auxiliary canister.

68. The system of claim 67, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump and the first heater to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

69. The system of claim 68, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump and the second heater to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

70. The system of claim 67, wherein, if the sensed operating pressure of the ullage is less than the second set point, the controller is adapted to operate the auxiliary recovery valve to prevent the flow of vapors pumped by the vapor pump through the auxiliary canister; operate the auxiliary regeneration valve to permit VOC-vapors within the auxiliary canister to be exhausted by the vacuum pump; and operate the vacuum pump and auxiliary heater to evacuate the VOC vapors within the auxiliary canister to the ullage.

71. The system of claim 42, further including:

a recirculation circuit coupled to the vapor pump for controllably recirculating vapors around the vapor pump.

72. The system of claim 42, further including:

a first recirculation flow passage coupled to the first VOC adsorbent canister for recirculating non-VOC vapors through the first VOC adsorbent canister; and a second recirculation flow passage coupled to the second VOC adsorbent canister for recirculating non-VOC vapors through the second VOC adsorbent canister.

73. The system of claim 42, wherein the vapor pump is adapted to operate in a first operating mode to pump vapors at a first volumetric flow rate and in a second operating mode to pump vapors at a second volumetric flow rate; and wherein the first volumetric flow rate is less than the second volumetric flow rate.

74. The system of claim 73, wherein, if the operating pressure of the ullage is greater than the first set point, the controller is adapted to operate the vapor pump in the first operating mode.

75. The system of claim 74, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

76. The system of claim 75, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

77. The system of claim 73, wherein, if the operating pressure of the ullage is greater than a second set point, the controller is adapted to operate the vapor pump in the second operating mode.

78. The system of claim 77, further including:

an auxiliary canister containing a VOC adsorbent material coupled to the atmospheric vent;

an auxiliary recovery valve coupled between the vapor pump and the third canister for controlling the flow of vapors from the vapor pump to the auxiliary canister; and an auxiliary regeneration valve coupled between the vacuum pump and the auxiliary canister for controlling the exhaustion of vapors from the auxiliary canister by the vacuum pump;

wherein the controller is coupled to the auxiliary recovery valve, and the auxiliary regeneration valve; and wherein, if the sensed operating pressure exceeds the second set point, the controller is adapted to operate the auxiliary recovery valve to permit vapors pumped by the vapor pump to flow through the auxiliary canister;

wherein substantially all of the VOC-vapors are adsorbed within the auxiliary canister and substantially all of the non-VOC vapors are exhausted from the auxiliary canister to the atmosphere through the atmospheric vent; and wherein the first set point is less than the second set point.

79. The system of claim 78, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

80. The system of claim 79, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

81. The system of claim 78, wherein, if the sensed operating pressure of the ullage is less than the second set point, the controller is adapted to operate the auxiliary recovery valve to prevent the flow of vapors pumped by the vapor pump through the auxiliary canister; operate the auxiliary regeneration valve to permit VOC-vapors within the auxiliary canister to be exhausted by the vacuum pump; and operate the vacuum pump to evacuate the VOC vapors within the auxiliary canister to the ullage.

82. The system of claim 42, further including:

a first VOC-vapor sensor coupled to the first canister for sensing the level of VOC-vapor saturation of the VOC adsorbent materials of the first canister; and a second VOC-vapor sensor coupled to the second canister for sensing the level of VOC-vapor saturation of the VOC adsorbent materials of the second canister.

83. The system of claim 82, wherein the VOC-vapor sensors sense the VOC-vapor concentration.

84. The system of claim 82, wherein the VOC-vapor sensors sense the weight of the canisters.

85. The system of claim 82, wherein the VOC-vapor sensors sense the vapor pressure.

86. The system of claim 82, wherein, if the first VOC-vapor sensor indicates that the first canister is saturated, the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

87. The system of claim 86, wherein, if the second VOC-vapor sensor indicates that the second canister is saturated, the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

88. The system of claim 42, wherein, after the passage of a predetermined first time period, the controller is further adapted to operate the first recovery valve to prevent vapors pumped by the vapor pump from flowing through the first canister; operate the first regeneration valve to permit VOC-vapors within the first canister to be exhausted by the vacuum pump; operate the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

89. The system of claim 88, wherein, after the passage of a predetermined second time period, the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

90. The system of claim 42, wherein, if the sensed operating pressure of the ullage exceeds a predetermined alarm set point, then the controller generates an alarm.

91. The system of claim 42, further including:

a vapor pump flow meter coupled to the vapor pump and the controller for monitoring the flow rate of the vapors pumped by the vapor pump.

92. The system of claim 91, wherein, if the flow rate of the vapors pumped by the vapor pump exceeds a predetermined alarm set point, then the controller stops the operation of the vapor pump and generates an alarm.

93. The system of claim 42, further including:

a vapor pump pressure sensor coupled to the vapor pump and the controller for monitoring the operating pressure of the vapors pumped by the vapor pump.

94. The system of claim 93, wherein, if the operating pressure of the vapors pumped by the vapor pump exceeds a predetermined alarm level, then the controller stops the operation of the vapor pump and generates an alarm.

95. The system of claim 42, further including:

an exhaust flow meter coupled to the atmospheric vent and the controller for monitoring the flow rate of vapors exhausted through the atmospheric vent.

96. The system of claim 42, further including:

an atmospheric vent VOC-vapor sensor coupled to the atmospheric vent and the controller for sensing the concentration of VOC-vapors in the atmospheric vent.

97. The system of claim 96, wherein, if the concentration of VOC-vapors in the atmospheric vent exceeds a predetermined alarm level, the controller is adapted to stop the operation of the vapor pump and generate an alarm.

98. The system of claim 42, further including:

a vacuum pump pressure sensor coupled to the vacuum pump and the controller for sensing the operating pressure of the inlet of the vacuum pump.

99. The system of claim 42, wherein the first canister includes:

a first housing containing the VOC adsorbent material;

a first strain gauge coupled to the first housing and the controller; and wherein the second canister includes:

a second housing containing the VOC adsorbent material; and a second strain gauge coupled to the second housing and the controller.

100. The system of claim 42, wherein the first canister includes:

a first housing containing the VOC adsorbent material;

a load cell coupled to the first housing and the controller; and wherein the second canister includes:

a second housing containing the VOC adsorbent material; and a second load cell coupled to the second housing and the controller.

101. The system of claim 42, further including:

a first heater operably coupled to the first canister and the controller for regenerating the VOC adsorbent materials within the first canister; and a second heater operably coupled to the second canister and the controller for regenerating the VOC adsorbent materials within the second canister.

102. The system of claim 101, wherein the controller is further adapted to operate the first recovery valve to prevent vapors pumped by the vapor pump from flowing through the first canister; operate the first regeneration valve to permit VOC-vapors within the first canister to be exhausted by the vacuum pump; operate the first heater and the vacuum pump to exhaust VOC-vapors from the VOC adsorbent material of the first canister to the ullage; and operate the second recovery valve to permit vapors pumped by the vapor pump to flow through the second canister; and wherein substantially all of the VOC-vapors are adsorbed within the second canister and substantially all of the non-VOC vapors are exhausted from the second canister to the atmosphere through the atmospheric vent; and wherein the VOC-vapors within the first canister are exhausted to the ullage.

103. The system of claim 102, wherein the controller is further adapted to operate the first recovery valve to permit vapors pumped by the vapor pump to flow through the first canister; operate the first regeneration valve to prevent VOC-vapors within the VOC adsorbent material of the first canister from being exhausted by the vacuum pump; operate the second recovery valve to prevent vapors pumped by the vapor pump from flowing through the second canister; operate the second regeneration valve to permit VOC-vapors within the second canister to be exhausted by the vacuum pump; and operate the vacuum pump and the second heater to exhaust VOC-vapors from the VOC adsorbent material of the second canister to the ullage; and wherein substantially all of the VOC-vapors are adsorbed within the first canister and substantially all of the non-VOC vapors are exhausted from the first canister to the atmosphere through the atmospheric vent; and wherein the VOC-vapors within the second canister are exhausted to the ullage.

104. A vapor recovery system for a fuel storage tank having an ullage including VOC vapors and non-VOC vapors, comprising:

means for sensing the operating pressure of the ullage;

means for pumping vapors out of the ullage at a first flow rate when the sensed operating pressure of the ullage exceeds a first set point;

means for pumping vapors out of the ullage at a second flow rate when the sensed operating pressure of the ullage exceeds a second set point;

means for adsorbing VOC-vapors out of the pumped vapors; and means for exhausting substantially all of the non-VOC vapors to the atmosphere.

105. The system of claim 104, further comprising:

means for regenerating the means for adsorbing.

106. The system of claim 104, further including: means for determining if the means for adsorbing is saturated.

107. The system of claim 104, further including: auxiliary means for adsorbing VOC-vapors out of the pumped vapors.

108. The system of claim 107, further including: means for regenerating the auxiliary means for regenerating.

109. The system of claim 107, further including: means for determining if the auxiliary means for regenerating is saturated.

* * * * *